US012475778B1

(12) United States Patent
Andres et al.

(10) Patent No.: US 12,475,778 B1
(45) **Date of Patent: *Nov. 18, 2025**

(54) HAZARD DETECTION APPARATUS, SYSTEM AND METHODS

(71) Applicant: Forge Technologies, Inc., Hillsborough, NC (US)

(72) Inventors: John J. Andres, Hillsborough, NC (US); Michael Rabbett, Manchester (GB); Matthew Fitzpatrick, Manly West (AU)

(73) Assignee: Forge Technologies, Inc., Hillsborough, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,563

(22) Filed: Mar. 11, 2024

Related U.S. Application Data

(63) Continuation of application No. 17/941,913, filed on Sep. 9, 2022, now Pat. No. 11,928,954.

(60) Provisional application No. 63/242,228, filed on Sep. 9, 2021.

(51) Int. Cl.

| | |
|---|---|
| ***G08B 29/18*** | (2006.01) |
| ***G08B 17/06*** | (2006.01) |
| ***G08B 21/10*** | (2006.01) |
| ***G08B 29/26*** | (2006.01) |

(52) U.S. Cl.
CPC ........... *G08B 29/185* (2013.01); *G08B 17/06* (2013.01); *G08B 21/10* (2013.01); *G08B 29/26* (2013.01)

(58) Field of Classification Search
CPC ...... G08B 29/185; G08B 17/06; G08B 21/10; G08B 29/26
See application file for complete search history.

(56) References Cited

U.S. PATENT DOCUMENTS

| | | | | |
|---|---|---|---|---|
| 3,860,919 | A * | 1/1975 | Aker | G08B 17/117 340/634 |
| 5,311,167 | A * | 5/1994 | Plimpton | G08B 29/183 250/339.05 |
| 5,339,070 | A * | 8/1994 | Yalowitz | F23N 5/082 250/339.05 |
| 5,945,924 | A * | 8/1999 | Marman | G08B 17/10 340/928 |
| 7,126,467 | B2 * | 10/2006 | Albert | G08B 17/00 340/407.1 |
| 9,437,094 | B2 * | 9/2016 | Goldenson | G08B 17/11 |
| 9,824,574 | B2 * | 11/2017 | Piccolo, III | G08B 29/188 |
| 11,928,954 | B1 * | 3/2024 | Andres | G08B 17/02 |
| 2011/0291843 | A1 * | 12/2011 | Andersen | G08B 17/10 340/584 |

* cited by examiner

*Primary Examiner* — John A Tweel, Jr.
(74) *Attorney, Agent, or Firm* — MacCord Mason PLLC

(57) ABSTRACT

Hazard detectors are shown and described. Included are devices, systems, kits, and methods for a hazard detector. A hazard detector may in some embodiments include a housing, a presence detector, a hazard detector and a control system. In some examples, hazard detector systems may include a hazard detector having one or more sensors with the ability to detect a hazard and a system for evaluating the hazard for characteristics prior to signaling an alarm. A hazard detector may include power saving systems for longevity and reliability of the detector.

21 Claims, 24 Drawing Sheets

TABLE 1

Table 1. Illustration of Accidental Flame at Selected Background Levels

TABLE 2

TABLE 3

HAZARD DETECTION APPARATUS, SYSTEM AND METHODS

This application is a continuation of U.S. application Ser. No. 17/941,913, filed Sep. 9, 2022, which claims the benefit of U.S. provisional application No. 63/242,228, filed Sep. 9, 2021, which are incorporated herein by reference in their entireties.

FIELD OF THE TECHNOLOGY

The present disclosure relates generally to hazard detection devices, systems and methods, and more particularly by way of example, to an improved flame detector apparatus, system, kit, and methods.

BACKGROUND

While flame detectors have been used in some industrial applications, it is typically in situations to ensure a flame is detected, by way of example, sensing a "pilot light" presence. For example, in instances where a pilot light is required prior to activating a main gas feed.

However, such technology has not been advanced for residential and commercial usage in scenarios where flame presence could be an unexpected and detrimental event. Applicant realizes that a hazard detector for an adverse event, by way of example, flame detection and monitoring, could be advantageous in an economical and reliable device, system, and/or method. Measuring and understanding when a hazard, such as a flame, should and should not be present is complicated and the standard for residential and commercial warning systems is conventionally smoke detectors. By the time smoke is detected, valuable time may have been lost for evacuation or cessation activities. Economical and reliable detection has otherwise though eluded the industry.

Therefore, Applicant desires hazard detection devices, systems, kits, and methods for a residential and/or commercial usage, by way of example, a flame and/or other hazard detector, toward these and other challenges in the art.

SUMMARY

In accordance with the present disclosure, hazard detection devices are provided that are economical, reliable, streamlined, and easily usable. This disclosure provides improved devices, kits, systems, and hazard detection and warning apparatus and methods that are convenient yet efficient, durable yet aesthetically home friendly, and yet economical.

While the present disclosure uses exemplary detection and notification of flame as a hazard, one of ordinary skill in the art will appreciate that the scope of the inventions of the present disclosure extend to detection and notification of other hazards as well, by way of example, hazards such as smoke or toxic gas, such as Carbon Monoxide.

There are many causes of residential fires in the home. One of the more significant causes is unattended cooking fires. In a typical case, food is left on a heat source or candles are left burning and the occupants leave the space and forget or fall asleep, leaving the heat source unattended and creating the potential for a home fire.

Another hazard, that often concerns parents is children playing with matches and lighters in their bedrooms, still an unfortunate occurrence today. Smoke alarms typically have some detection threshold established and an output at the sensor is monitored by a microprocessor against a threshold.

Generally, once the output from the smoke exceeds a threshold, the device produces an alarm. This feedback chain for conventional detectors fail to consider occupancy by a human in the space. Occupancy considerations may play a part when considering, for example, kitchen fires. Kitchens still pose difficulty to most conventional smoke alarms, and many smoke alarms still contain warnings regarding false alarms when used near a kitchen. However, much data supports that the kitchen is one of the primary, if not the primary, space where residential fires begin and where most people may be prone to injury. This and other challenges are addressed and overcome by the inventions of the present disclosure.

One embodiment includes a hazard detector including a housing with a front, top, bottom, back, side, and an opposite side. A hazard detector may include a face, aperture piece, front cover, PC board assembly, and a rear cover. The hazard detector may include a battery compartment and battery door. A hazard detector may include a magnetic back. A hazard detector may include a mounting bracket. The mounting bracket may allow for placing the hazard detector at variable angles for monitoring of spaces.

The hazard detector, in one example, may include a speaker and/or a communication module for establishing a communication connection, for example to the internet and/or a WIFI network.

A hazard detector may include one or more sensors. The one or more sensors may detect similar and/or distinct variables. The sensors may work in tandem to produce a resulting action based upon the collective sensor information. The one or more sensors may detect a binary response and/or more than a binary response. In some examples, the sensors may detect not only the presence or absence of a hazard, for example a flame, smoke, etc., but also by way of example, the intensity of the hazard, the timing of the hazard, the hazard in view of another variable, and/or the location of the hazard as it occurs.

A hazard detector may include a hazard detection channel. A hazard detector may include a movement detection channel. A hazard detector may include a hazard detector channel and a movement detection channel. In some examples, a movement detection channel is adapted to detect a motion. Some embodiments may include a channel that includes an override where the sensing of the channel is allowed to be omitted. By way of example, a movement detection channel may not be necessary in some instances in areas where any sign of a hazard, such as a flame, is undesired, for example in children's bedrooms, on aircraft, and rooms in nursing homes, hospitals, hotels, prisons etc.

Embodiments include a hazard detector adapted to not only detect fires, but also in some embodiments measuring, and/or monitoring fires and/or other hazards. A sensor may be a presence detector. The presence detector may, for example, include detecting a variable, which may include a presence by way of motion, sound, imagery, absence of imagery, etc. In some examples, a presence detector may be adapted to detect a presence through more than one variable detection.

In certain examples, a hazard detector includes one or more sensors. By way of example, a hazard detector may include a high sensitivity UVC avalanche photodiode to detect a weak UVC radiation emitted by a flame. In some instances, the UVC wavelength range may be used because there are minimal sources of UVC in a domestic environment. The UVC sensor may be operated in the linear range as much as possible, which permits accurate measurement of the brightness (and hence size) of the flame. The hazard detector may include one or more, and in some examples, two motion sensors, working in tandem, allowing the invention to not alarm on the appearance of a flame if a human is present and to monitor the flame when or if the user leaves the room. The two motion sensors, by way of examples, may include a K-band doppler radar plus a Passive Infrared (PIR) motion sensor, with the field-of-view of the two sensors aligned.

Along with sensing capabilities, the hazard detector may include multiple communication options, for example, channels including WiFi (to a local modem and then to the internet or a user's phone), an I2C serial port for "wired-in" applications, an on-board loudspeaker allowing indication, warning and voice, communication, and/or a multi-color LED signaling system for warning and indication.

Examples include a hazard detector capable of detecting the appearance of a flame, checking whether a human was present when the flame was created, measuring the size of the flame signal, monitoring the flame over time, measuring changes in the flame, and/or communicating changes to a user.

The hazard detector may, in certain examples, monitor a flame while the user is absent, remind the user at intervals that the flame still exists, and/or react if the flame suddenly increases in size or disappears.

Events may be communicated and logged to the "cloud" with traceability of time stamped records back to a specific hazard detector. Each user may have a section in the cloud environment specific to a user's particular hazard device.

The hazard detector may include a hazard detector module. The hazard detector may include a firmware configured so that information regarding changes of mode, diagnostic information, and a log of other important events is stored locally and/or in the cloud. Such data can be used for tracking the incidents and history of a hazard detector in use in the field and/or for informing the user if degradation of performance is occurring. A hazard detector may include a self-monitoring system. Applicant realized that a challenge in the field is detectors/monitors, for example smoke detectors, expiring due to drained power source or removed batteries due to false alarm.

Sensors conventionally are predominantly optical and may look for characteristic optical emissions from a flame. A flame emits "light" over a wide range of wavelengths, and emission in the visible range are predominantly blackbody in nature and characteristic of the temperature of the flame. The emission is produced by hot carbon micrograins (soot) in the flame. The blackbody emission actually extends from wavelengths in the near UV, through the visible and into the IR, where it is supplemented by molecular band emission from flame product species like carbon dioxide and water. At the UV end of the emission spectrum there is also additional emission from chemical species, though in this case it is from short lived radicals created during combustion and this emission is extremely weak and typically extends to wavelengths shorter than 200 nm.

For detection of accidental fires, mainly at close quarters, the wavelength band of choice is, in one example, midinfrared, which for hydrocarbon fires means emission from hot CO2 at about 4.5 μm and longer. At this wavelength, the ambient environment is saturated with radiation and the flame is separated from this background because it flickers. The emission from a naturally ventilated (rather than force ventilated or pre-mixed) flame contains fluctuations at frequencies of around 10 Hz caused by the dynamics of oxygen flow into the combustion zone. However, for situations where the background is even higher, such as outdoors or next to a hot furnace, the wavelength may be UVC, by way of example sensors in this wavelength range may be from Hamamatsu of Japan. Such a UVC sensor maintains lowered cost, with simplicity of operation, with no need to process the sensor output to recover flicker information. In addition, the gas burners on a kitchen range are usually laminar flames caused by pre-mixing of the oxygen and fuel before combustion, which as Applicant realized, do not exhibit flicker.

Embodiments may include a hazard detector and detection system combining hazard sensing with motion detection to derive a set of resultant actions. Included may be a hierarchical firmware architecture, switching between modes dependent on sensors signals with altered behavior dependent on current operating mode. The hazard detection system may include, by way of example, sophisticated hazard, by example flame, processing including an averaging filter combined with a rate-of rise routine, which triggers a reset of the filter, for rapid changes in flame intensity to ensure fast response.

Also included, may be a sound mode for producing a sound when a hazard first appears, also providing confidence the hazard detection device is working and operational. A notification may also be issued to a user if a hazard signal is too large, and saturation is affecting functioning ability of the system.

A detection module may determine that, for example, detected flames are "friendly" (by way of example, a person was present when they were first detected and/or flames are expected in the detection space) and/or "hostile" (a flame was detected in the absence of a human and/or flames should never be detected in the detected space) with the latter leading to an alarm/notification. The hazard system may include a measurement of size of friendly flames and permit the presence of unchanging flames even if the user leaves the area, and/or a reminder to an absent user that a flame is still present. A warning system may warn an absent user if a flame suddenly disappears (for example, boil-over puts out flame but gas still on). A monitoring system may monitor for changes in hazard size and issue warnings, alarms or other actions using a number of alarm algorithms, including but not limited to, rate-of-rise.

Embodiments may include a hazard detector including diagnostic and monitoring modes.

In particular examples, the inventions of the present disclosure may include methods for flame detection and monitoring according to any of the embodiments or combination of embodiments of the present disclosure.

Still further within the scope of the inventions is considered a kit for flame detection according to any of the embodiments or combination of embodiments of the present disclosure. In one example, a kit includes a hazard detector and an installed monitoring and reporting system.

Other examples include a system for flame detection according to any of the embodiments or combination of embodiments of the present disclosure.

Additional examples include an assembly for detecting flames according to any of the embodiments or combination of embodiments of the present disclosure.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
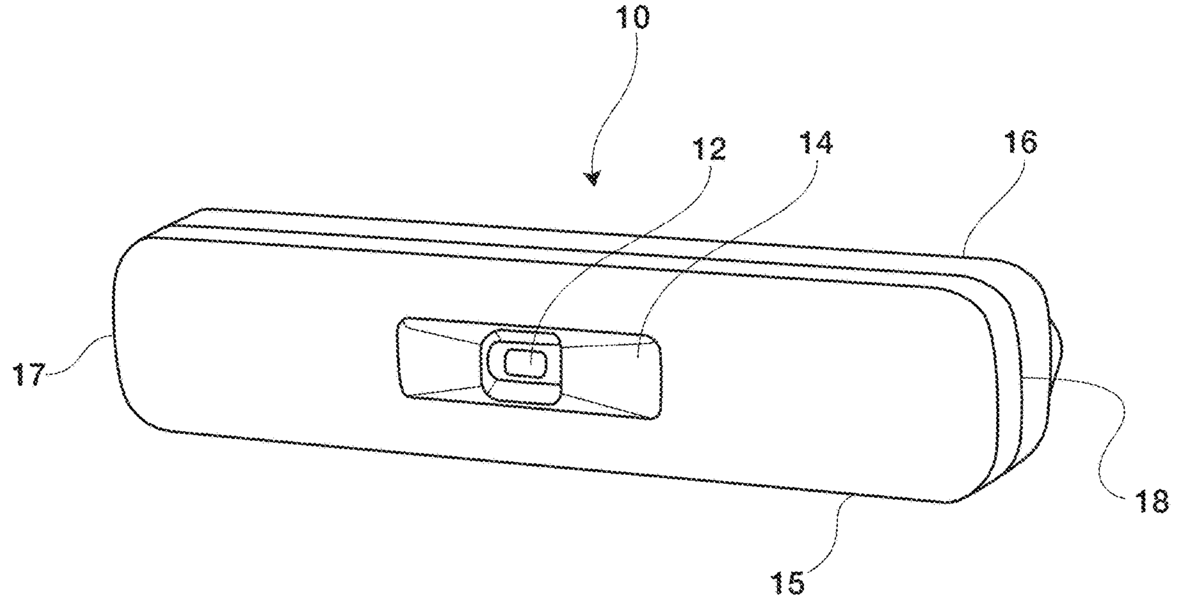
FIG. 1 is a front perspective view of one example of a hazard detector according to an embodiment of the disclosure.
Figure 2:
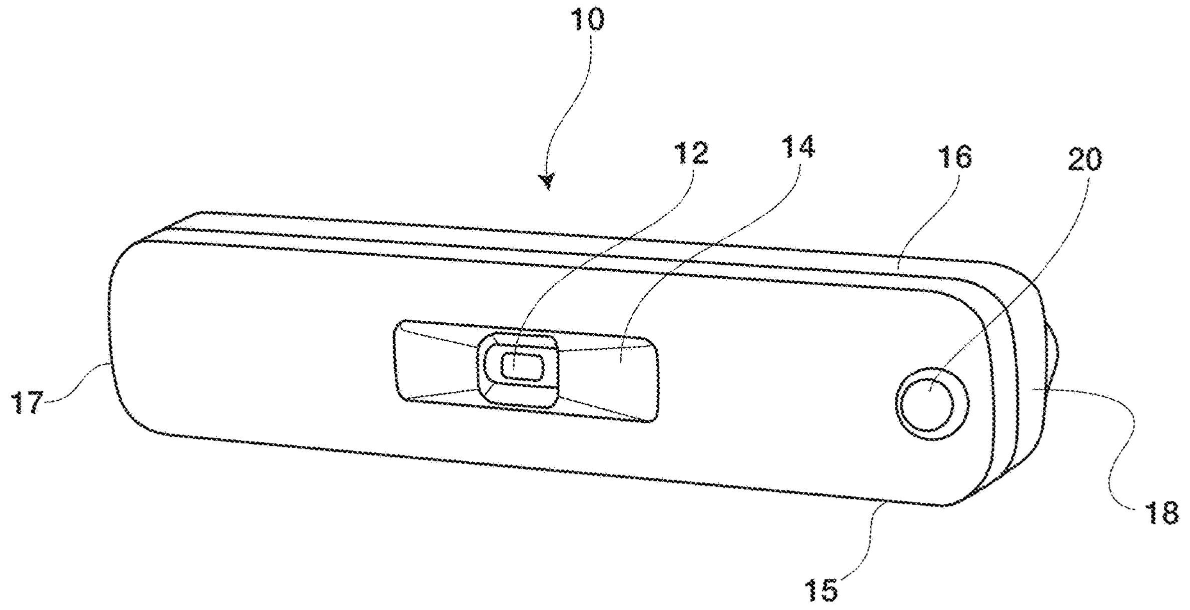
FIG. 2 is a front perspective view of another example of a hazard detector according to an embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general FIGS. 1-23, it will be understood that the illustrations are for the purpose of describing embodiments of the disclosure and are not intended to limit the disclosure or any invention thereto. One embodiment, shown for example in FIGS. 1-6, includes a hazard detector 10 including a housing 1 with a front 7, top 16, bottom 15, back 8, side 17, and opposite side 18. A hazard detector 10 may include a face 20, aperture piece 14, front cover 22, PC board assembly 24, and rear cover 28. The hazard detector 10 may include a battery compartment 26 and battery door 29. Hazard detector 10 may include a magnetic back 54, 55. Hazard detector 10 may include a mounting bracket 30.

Figure 3:
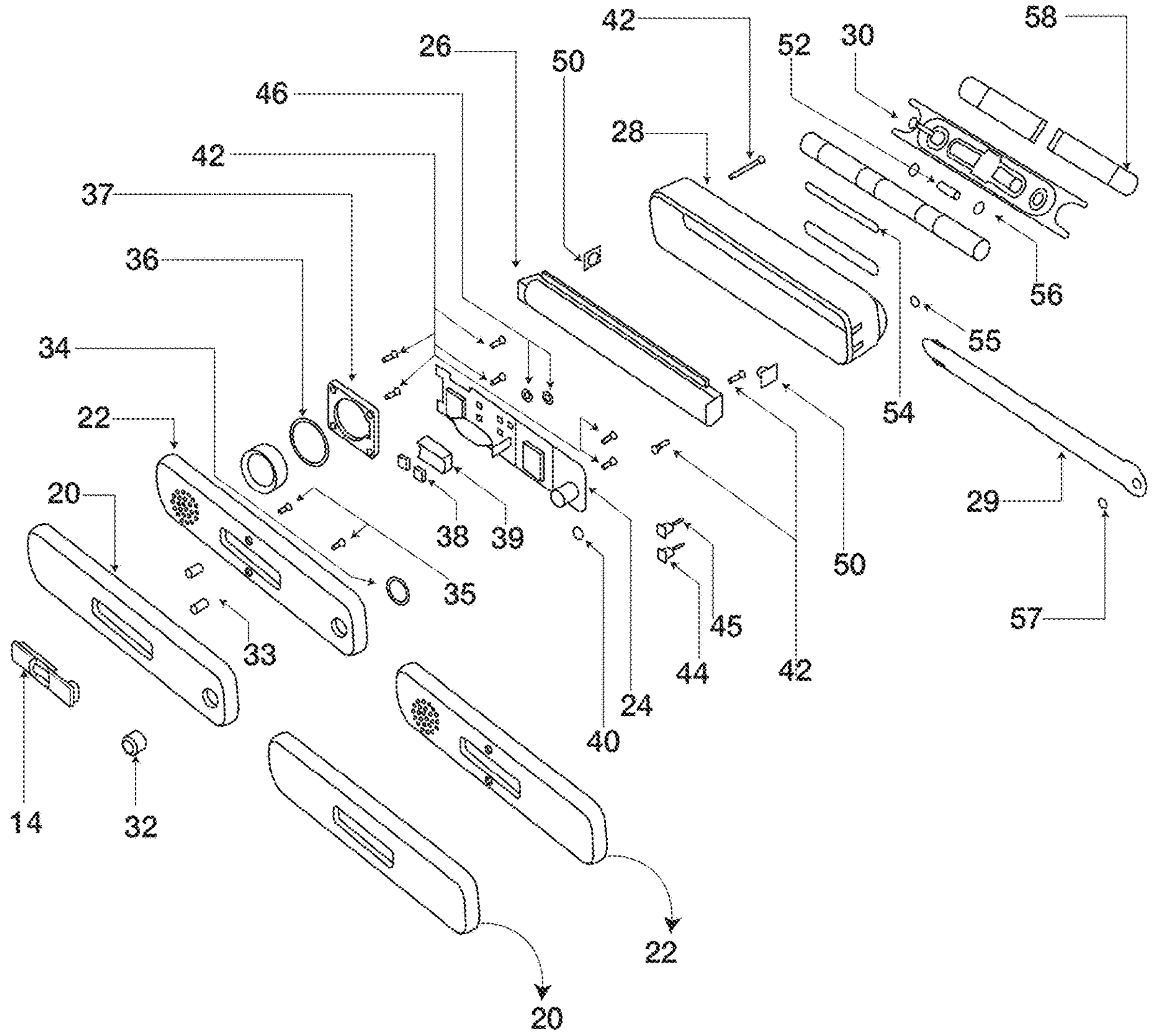
FIG. 3 is an exploded view of one example of a hazard detector according to an embodiment of the disclosure.

As shown in exploded view in FIG. 3, a hazard detector may include an on/of switch, light pipes 33, attachment and accessory parts 34, 35, 42, 46, 55, 58 (by way of example screws, nuts, bolts, foam tape, magnets, adhesive, Velcro, etc.). A speaker may be included and secured with a speaker frame 37. A PC board assembly 24 may include a reset button and/or a pairing button 44, 45. The PC board assembly 24 may connect with a sensor 40. Sensor 40 may be supported by a sensor cradle 39. More than one sensor 40 may be included. A battery terminal 50 may be included. A bubble level 52 may provide mounting information.

Figure 4:
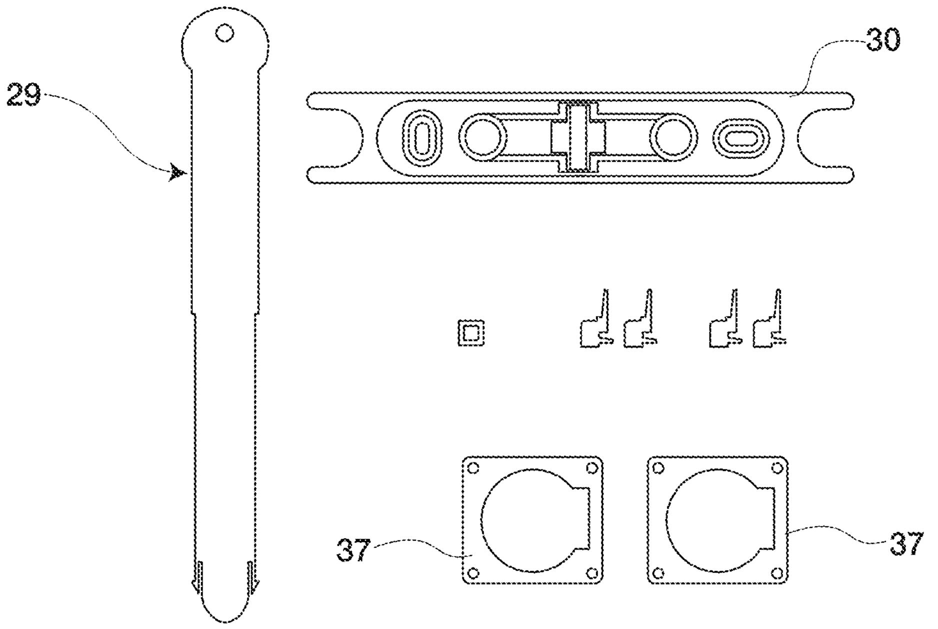
FIG. 4 is a closer up view of one example of various component parts of a hazard detector according to FIG. 3.
Figure 5:
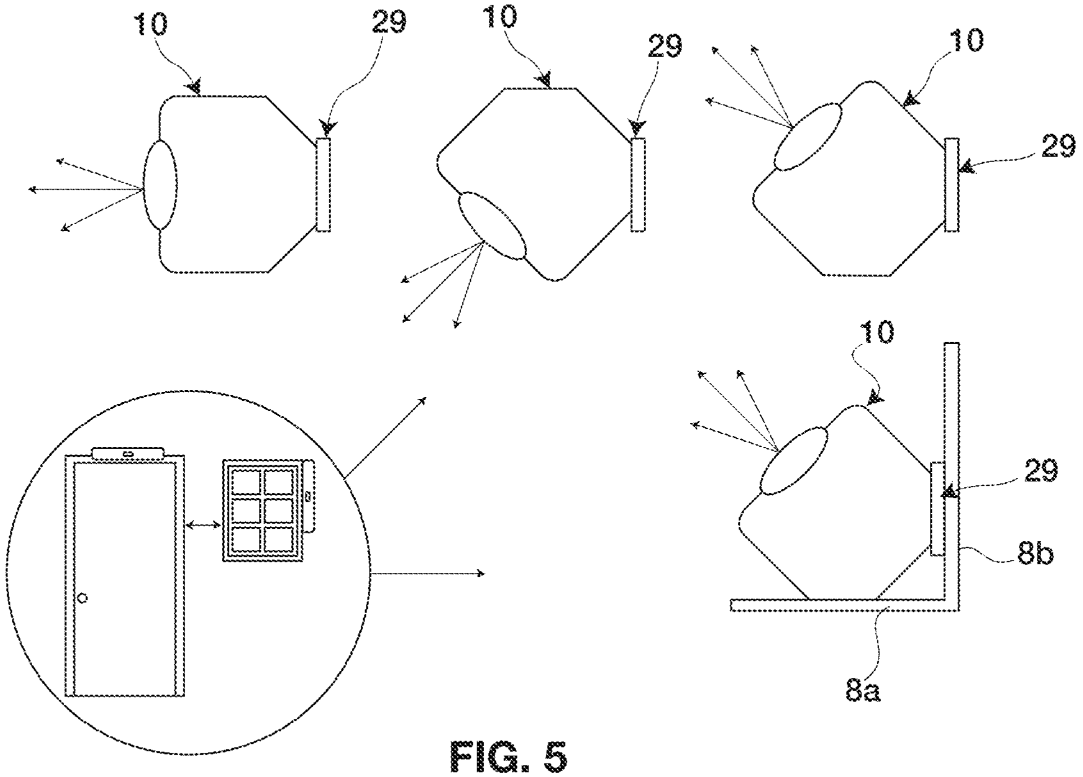
FIG. 5 is a schematic illustrating exemplary options for one example of a hazard detector and hazard detector system in use according to one embodiment of the present disclosure.
Figure 6:
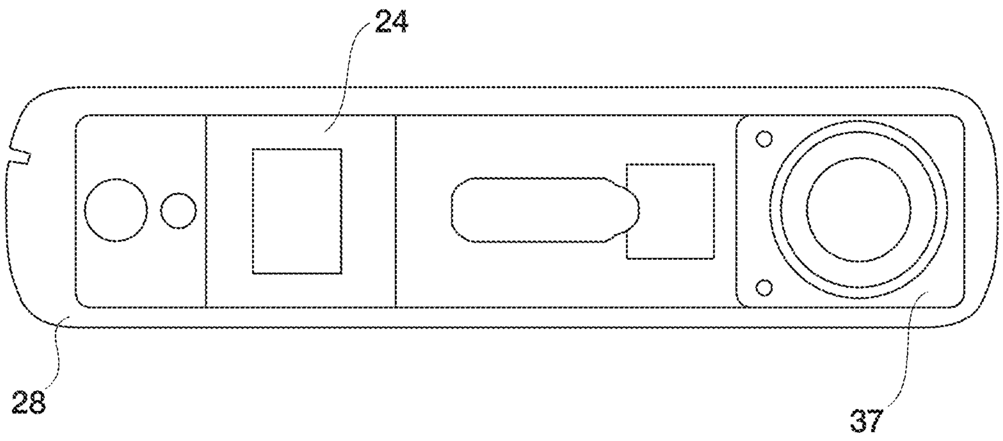
FIG. 6 is a front view of one example of a hazard detector with a front cover removed, according to one embodiment of the disclosure.

FIG. 4 illustrates exemplary mounting options for one example of a hazard detector 10 by way of a mount 29 that allow for mounting in various locations, by way of example, over a door, on a wall, in a corner, on the ceiling, on a piece of furniture, near a window, etc. Hazard detector 10 may be placed but not mounted in some instances.

Embodiments may include more than one, preferably two motion sensors. A sensor 40 used for detection of the presence of the user (motion detection) may, by way of example be a PIR and/or a doppler sensor. A PIR sensor may provide sensitivity to motion across the field-of-view of the sensor, detects movement of objects warmer (or colder) than the background environment (humans), and digital output. A Doppler Radar may provide a sensitivity to motion towards or away from the sensor, detection of most any movement, which may include distance speed and directional information, analogue output, information on multiple moving sources. A hazard detection system may include a hazard detector including at least two motion sensors, individually and in combination providing a reliable way of detecting the presence of the user (or another human) in the field-of-view.

A hazard may include any number of emergencies and/or events causing an alert. In some examples, a hazard may be a flame, smoke, toxic gas, such as CO, CO2. In some embodiments, a hazard may be any event recognizable and able to cause harm to an occupant.

A hazard detector may include a sensor 40 that is a hazard sensor, sensitive UVC, providing a reliable indication of the presence of an open flame. The hazard sensor may provide a quasi-analogue output in that the rate at which it emits pulses may be dependent on the brightness of a UVC source within its field-of-view, allowing the hazard detector 10 to measure and monitor a brightness of a UV source.

A hazard detector 10 may include a UVC detection system. In one example, a suitable sensor may be a Hamamatsu R2868 UVTron running at approximately 520V anode voltage at a refresh Rate of 700 Hz. Under these conditions, the system may detect a candle flame at about 45 ft and switching from 10 Hz operation to 700 Hz operation, with such a flame, at distances in excess of 30 feet.

An exemplary motion sensor may include a EKMB130111xK PIR sensor from Panasonic and/or a doppler radar from Innosent, or other suitable miniature radars. The field-of view of both sensors, in a horizontal plane, may be by way of example approximately +/−45 degrees. In the vertical plane the field-of-view of the PIR, may be +/−45 degrees, while the radar may be limited to +/−22 degrees (see by way of example FIG. 5). In particular examples, the hazard detector may be orientated to ignore movement at floor or ceiling level, eliminating possible false returns from pets and ceiling fans.

Embodiments of the present disclosure may include a hazard detector system including a presence detection and/or a hazard detection individually and/or in sync with one another. In some embodiments, a user may initiate a hazard only mode, a presence detection mode, and/or a combination presence detection, hazard detection mode.

Figure 8:
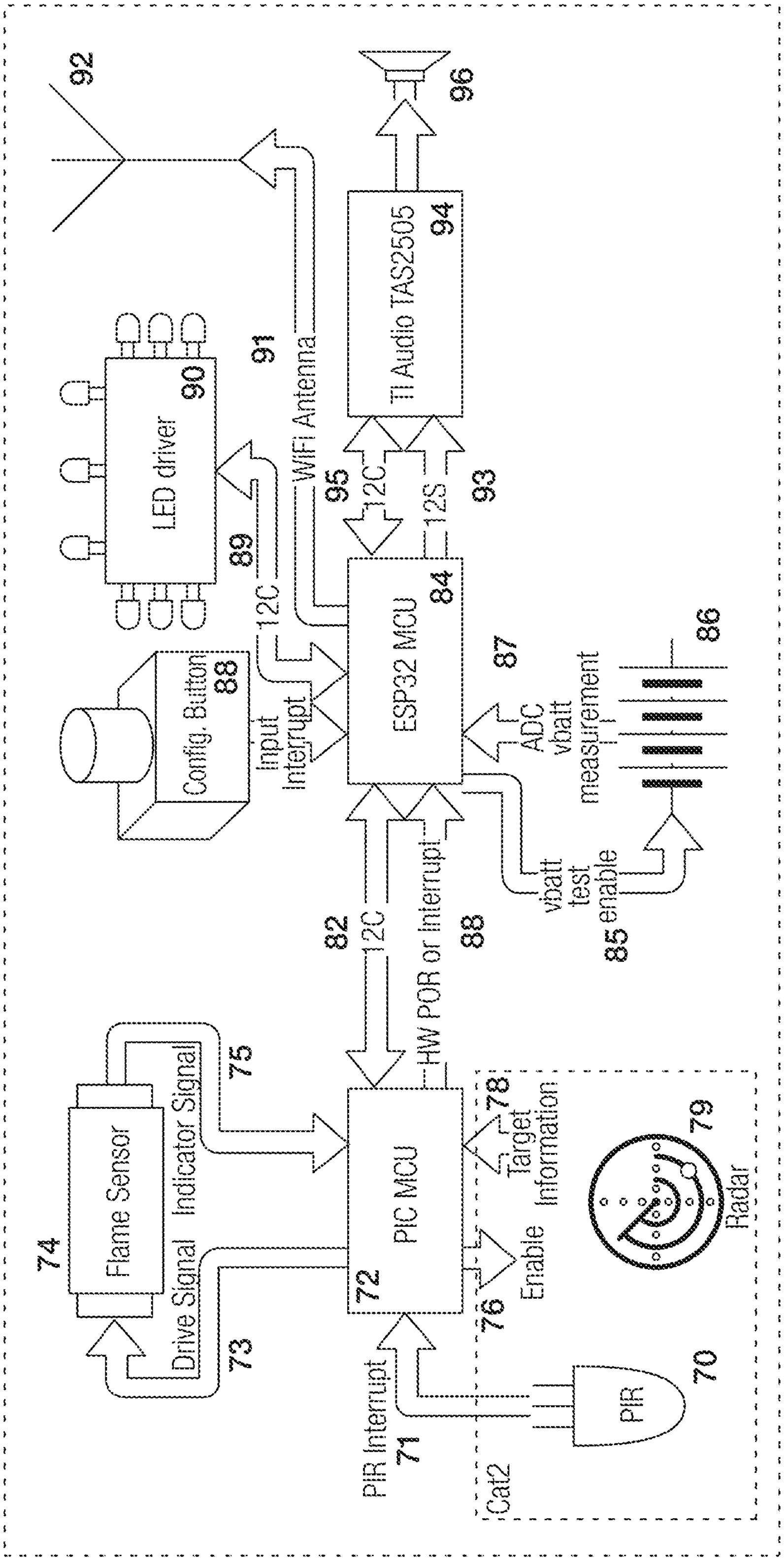
FIG. 8 is a diagram view of one example of a hazard detector for hazard detection according to the present disclosure.

FIG. 8 illustrates one example of a hazard system for hazard detection including a PIR sensor and a radar sensor detecting 70/79 information and in communication with a PIC MCU 72 through which information is enabled 76 and target information sent 78. A drive signal 73 may engage with a flame sensor at 74 and return an indicator signal 75. More than one MCU, for example and ESP32, may be included 84. Multiple communications may be established with the MCU 84, for example a WiFi communication 95, enhanced with a Wifi antenna 92, an audio system (93, 94, 95, and 96).

Figure 10:
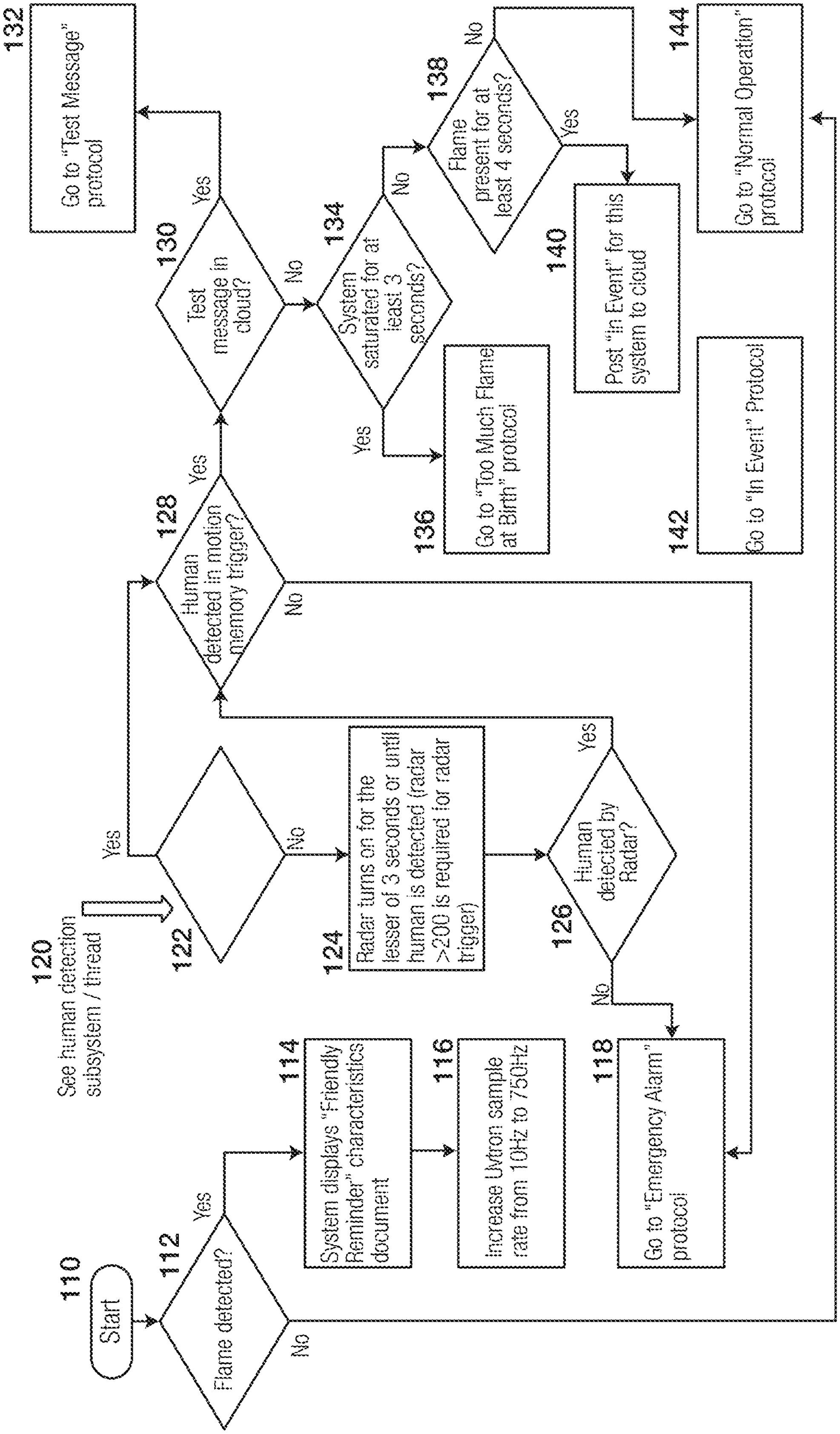
FIG. 10 is a block diagram exemplifying one example of a hazard detector use case at a flame birth according to the present disclosure.

FIG. 10 illustrates, in one embodiment, that a flame detected 112 may check for a friendly reminder 114 that friendly flame is possible. Sample rate may be increased 116 and if friendly determination made then allowance may be made with no signal. If a human is detected in the detection space 120 then a subsystem may be activated to evaluate the characteristics surrounding the person in the detection space 124, 126, 128. A message may be sent 130, saturation evaluated for time period 134, characteristics of the flame evaluated 136, 138 and either determine to be an event 140, 142 or normal operation resumed 144.

Figure 11A:
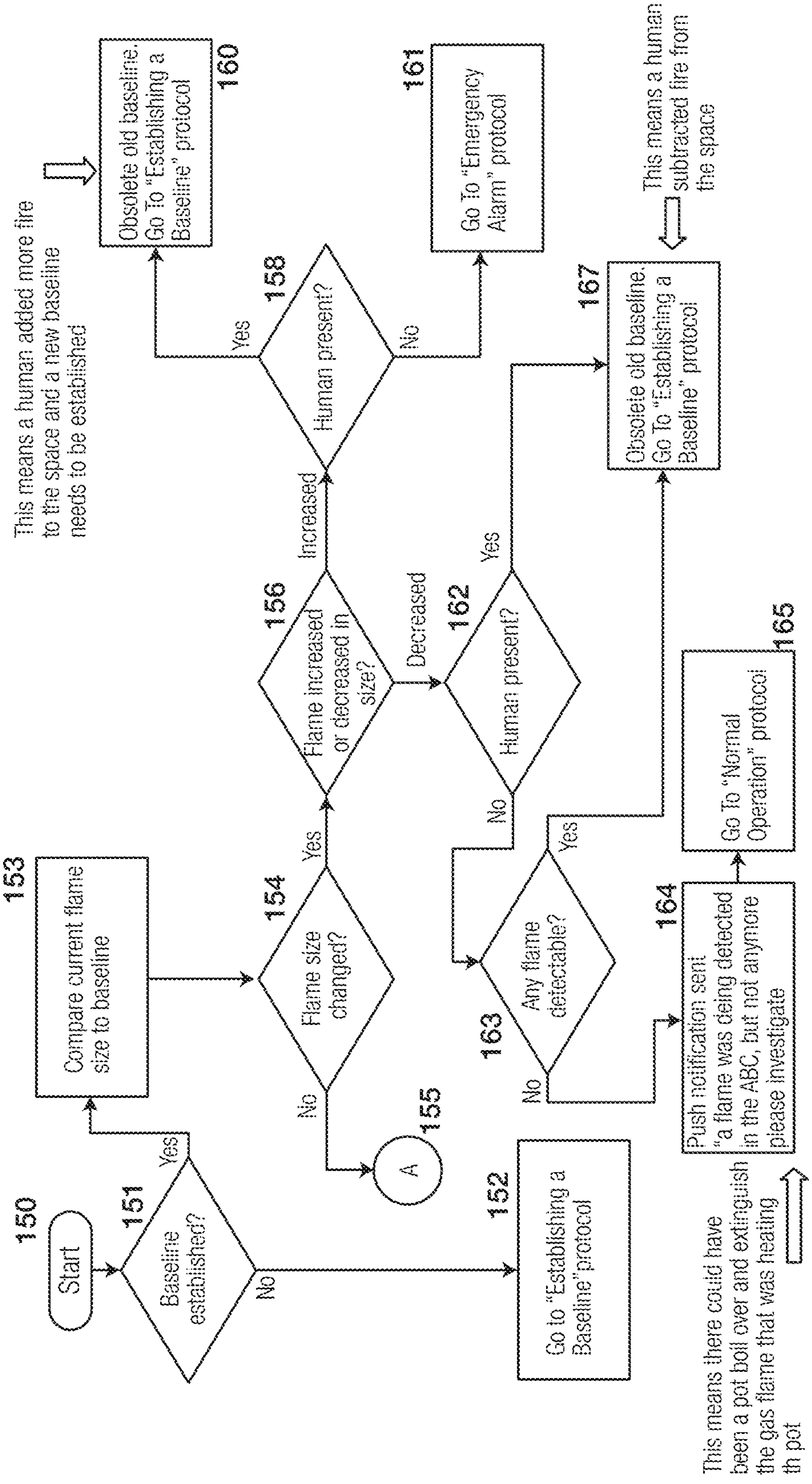
FIGS. 11A and 11B are block diagrams exemplifying a hazard detector event protocol and use case according to the present disclosure.
Figure 11B:
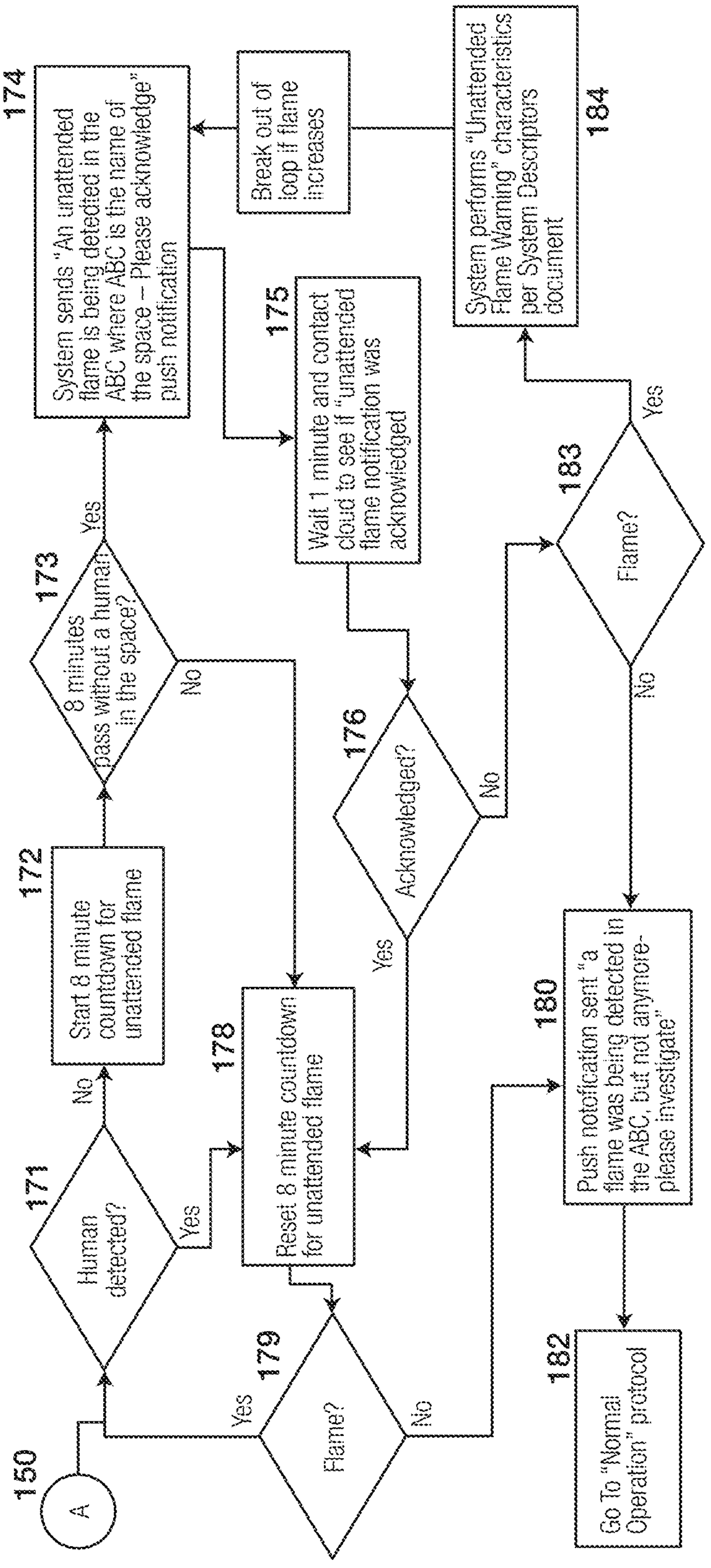

FIGS. 11A and 11B shows a hazard detection system progression through examples of recognized events and in event protocols. A baseline may be established 151 to compare a current flame to a baseline 153. The flame change may be determined to have no change 155 or a change 154 with an increase or decrease 156. If increased, presence of a human may be determined 158 and a new baseline established 160 or alarm signaled 161. If the flame decreased 162 the presence of a human may be determined, and if present then a new baseline may be established 167 and if not present 163 then flame is reevaluated 164, 167. If the original flame size had no change 155/179 then (at A, with start 150 only designating a beginning position for the chart shown and not necessarily the beginning of the process, algorithm, or progression) a human detected 171 may reset a time countdown for unattended flame 178 before detecting for flame again 179. If no flame then normal operation protocols and/or notice of flame detected but gone sent may initiate 180, 182, 183, 184. If no human presence is detected, when flame is, at 171 then a countdown may be enacted for no human in space detection 173. If presence is detected, then the countdown may be reset 178. If no presence is detected 173 then a notice may be sent of flame detection in unattended space 174. Verification of acknowledgement may be sought 175, 176 and then unattended flame count reset 178.

Figure 12:
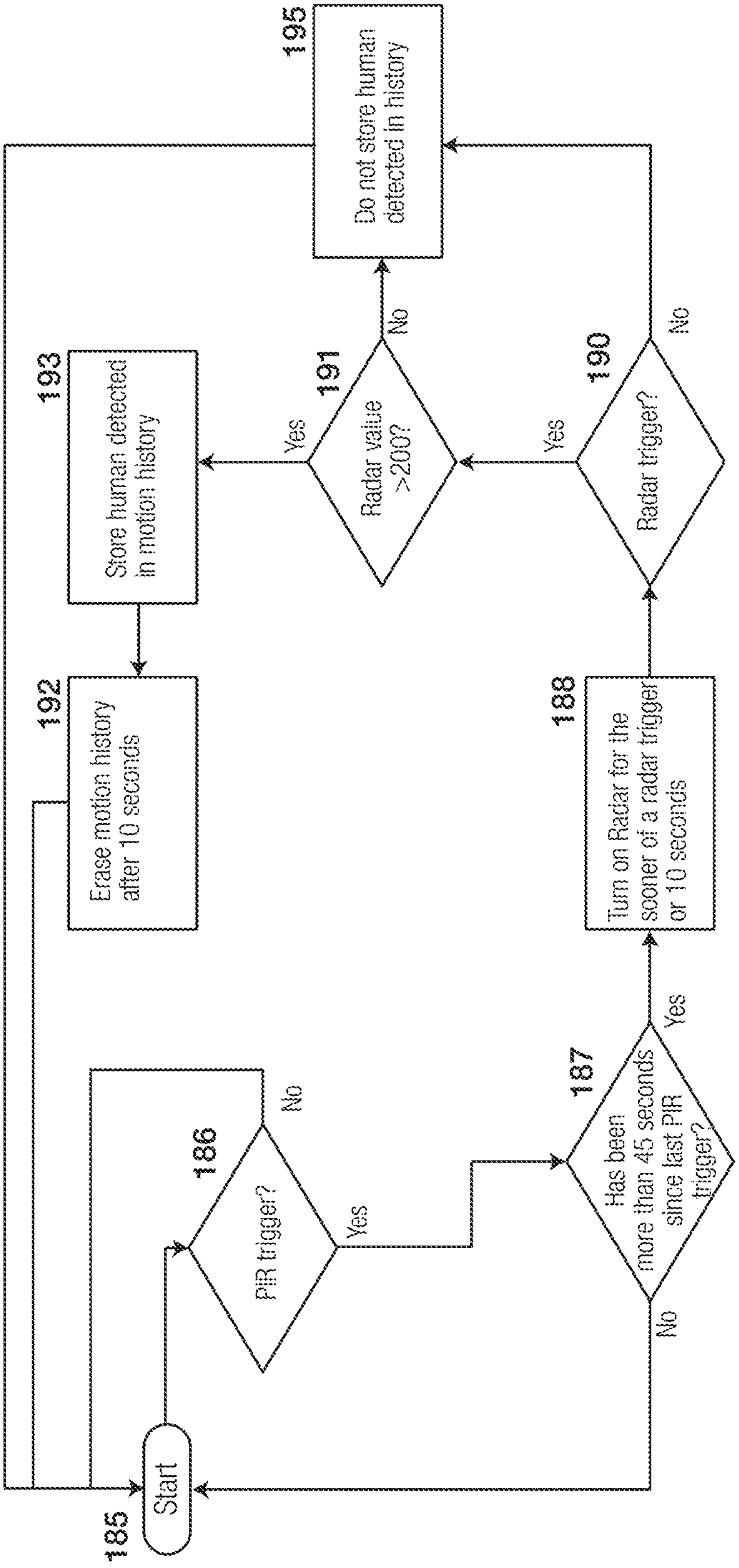
FIG. 12 is a block diagram exemplifying one example of a hazard detector subsystem according to the present disclosure.
Figure 13:
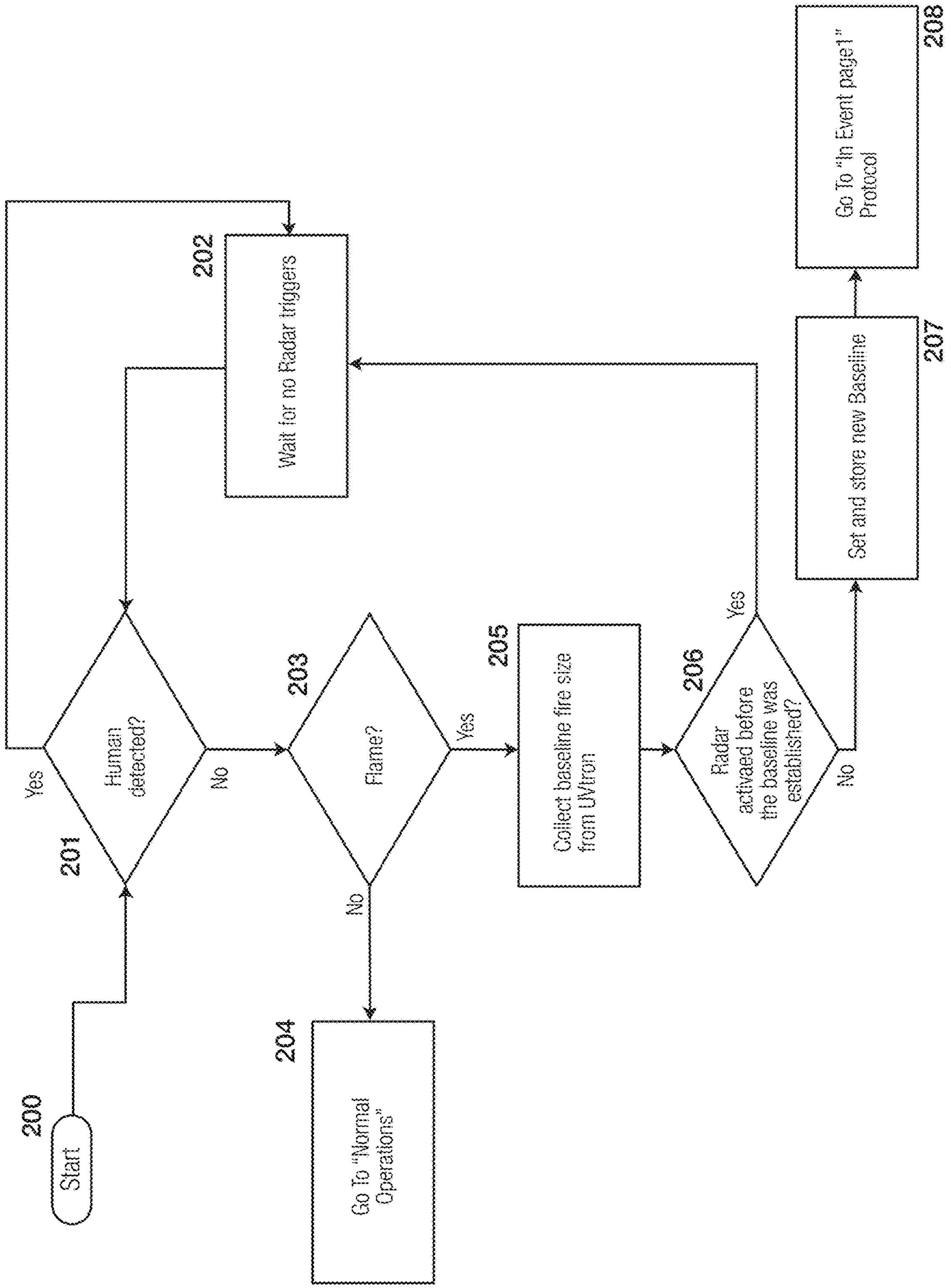
FIG. 13 is a block diagram exemplifying one example of another hazard detector subsystem according to the present disclosure.
Figure 14:
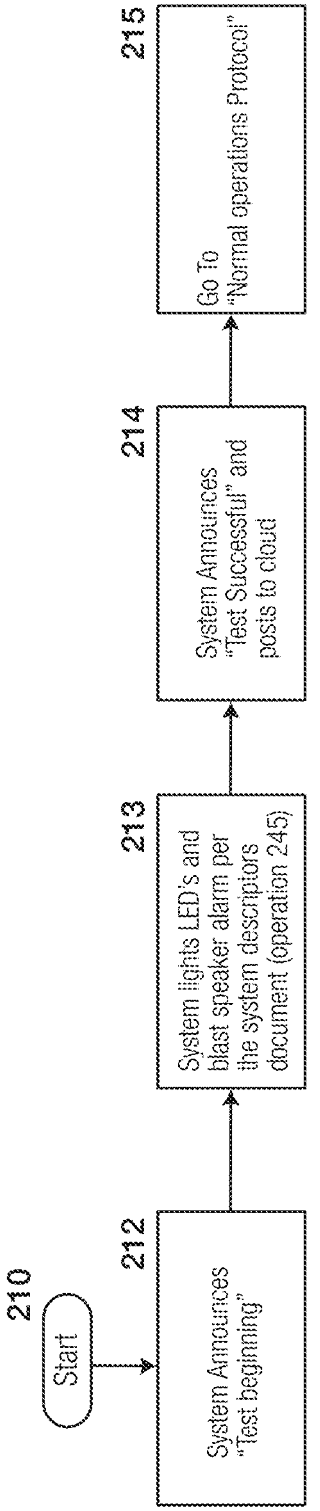
FIG. 14 is a block diagram exemplifying one example of a hazard detector subsystem according to the present disclosure.
Figure 15:
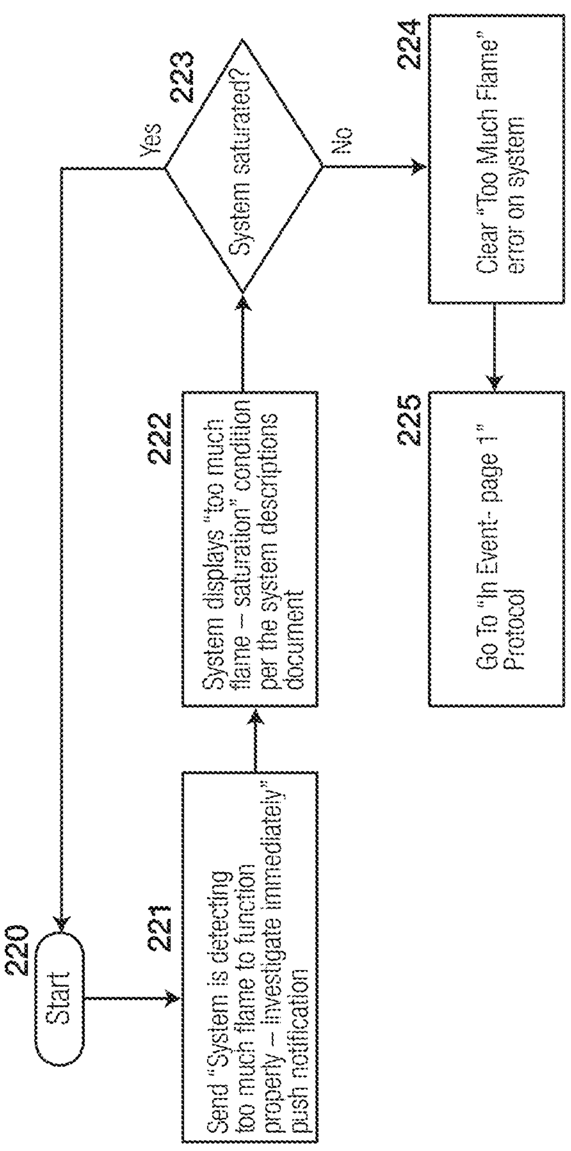
FIG. 15 is a block diagram exemplifying one example of a hazard detector use case detecting excessive flame at birth (saturation) according to the present disclosure.
Figure 16:
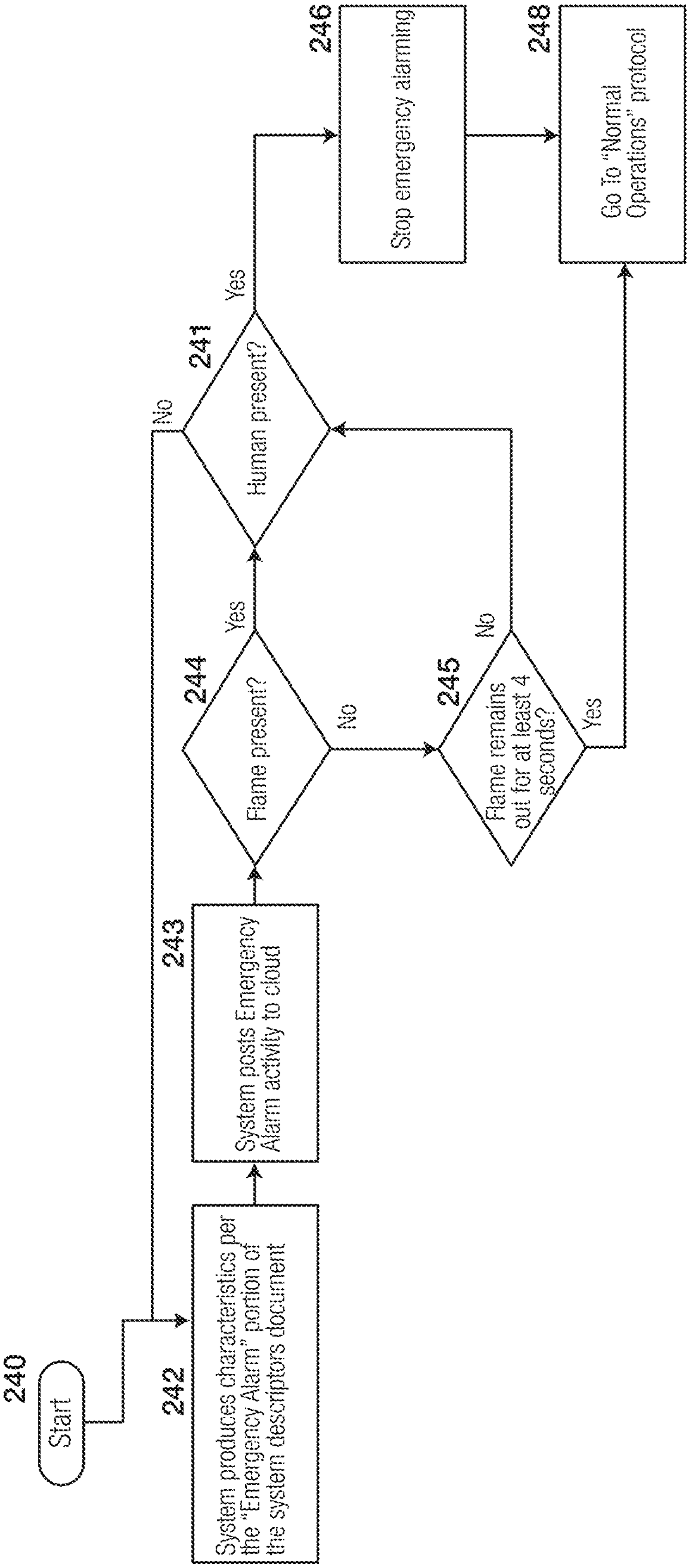
FIG. 16 is a block diagram exemplifying one example of a hazard detector use case emergency alarm protocol according to the present disclosure.

Subsystems may exist within the hazard detection system. FIG. 12 shows one example of a human detection subsystem. When a sensor, for example a Passive Infra-Red sensor (PIR) detects a trigger 186 then a timer may initiate to determine an amount of time between last and current PIR trigger 187. A radar sensor may be initiated 188 and if a trigger detected 190 then the value measured 191. If no trigger then no memory is stored of human presence detected 195. If the value initiates a trigger 191 then human presence detection may be stored in memory 193 with motion history erased after a set timeframe 192. In other examples, baselines may be established, as shown in one example in FIG. 13 201-208; Communication protocols set as in the example in FIG. 14 212-215; Saturation protocols (too much flame at birth) in FIG. 15 221-224; Emergency Alarm protocols in FIG. 16 242-248.

Figure 7:
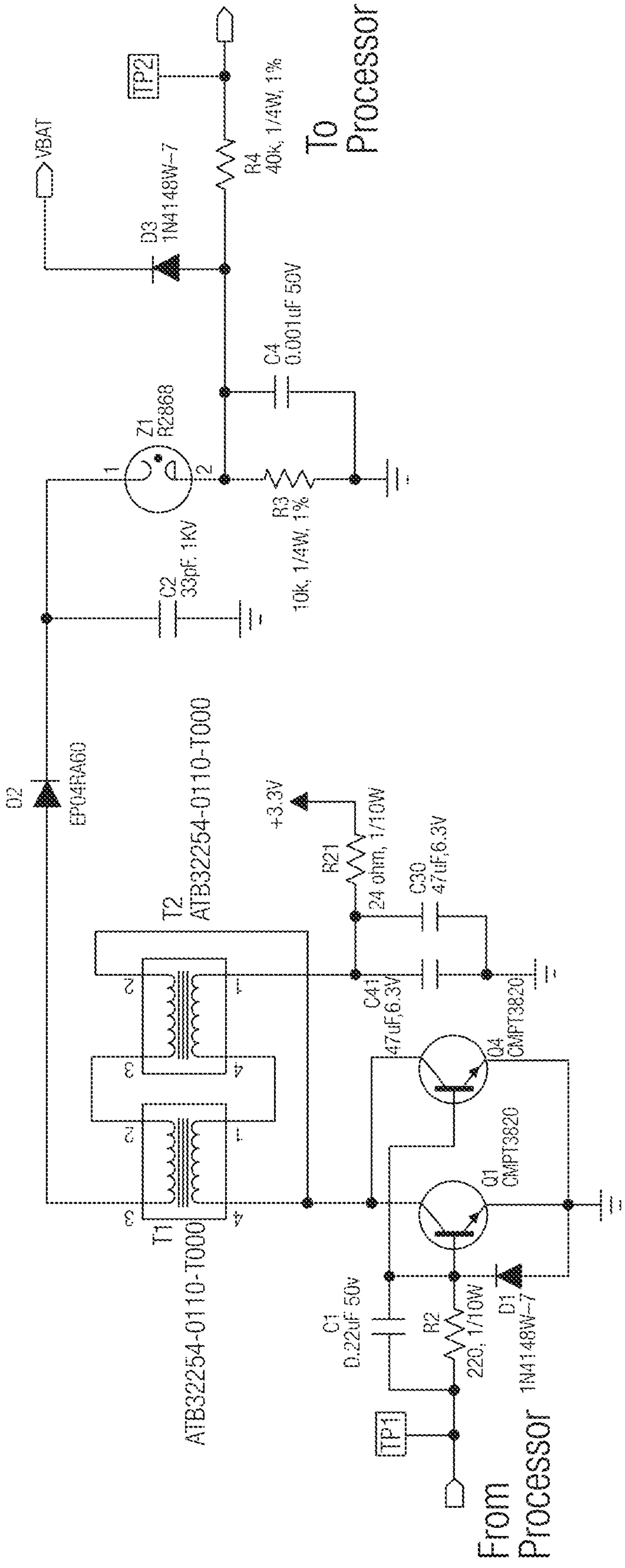
FIG. 7 is an illustration of one example of a drive circuit for a UVC sensor according to one embodiment of the disclosure.

A hazard detector system may include a sophisticated supervision system to ensure that sensors are working correctly and to sound a warning if detection of failure. A hazard detector 10 may include a sensor for detecting flame. In one example, a sensor may be a UVC sensor, as opposed to devices that detect smoke or gas. In certain embodiments, a UVC sensor includes a refresh mode. FIG. 7 represents an exemplary electronic circuit design for a UVC sensor in a hazard detector 10. In some examples a hazard detector system may include a battery power source. In one example, a battery power source may be 3 lithium AA batteries. In another example, a power source may include alkaline batteries.

The hazard detection system may include a passive monitoring of the UVC sensor. A passive monitoring may include monitoring using Cosmic Rays and/or Background Radioactivity as a source. The hazard detection system may include an active monitoring of the UVC sensor. Active monitoring may include using a Test mode. The hazard detection system may include an active monitoring of a high voltage driver for a UVC sensor using multiple Refresh Rates. The hazard detection system may include monitoring the health of a radar sensor using a noise burst. A hazard detection system may include checking that a PIR is triggered at least once every 24 hours, and/or recording of diagnostics in the cloud for trend calculation with warnings to users if applicable, for example if their device is malfunctioning.

In some embodiments, a hazard detection system may include a hazard detector 10 including three sensors. The three sensors may be a first motion sensor, a second motion sensor, and a UVC sensor. In certain examples, the first sensor may be a PIR sensor. In certain examples, a second sensor may be a Doppler Radar sensor. A self-monitoring for each sensor may be included in a hazard detection system.

A Passive Infra-Red sensor (PIR) may be, in one example, a device including a pyro-electric sensor element plus a FET for impedance conversion and logic, combined with a plastic lens array. PIRs are highly reliable and maintenance free, and durable. A PIR sensor may be permanently monitored to check for human presence and the PIR sensor output in the time immediately before a flame is detected may be used to confirm, or help confirm the presence of a human. A PIR sensor may include a check for an activation of at least once per 24 hour period since the device is intended for use in occupied areas. If there is no activation in a 24 hour period, then typically either the PIR has failed or the user(s) are away. The user can register in the cloud with the system that they are away. Alternatively, the hazard detection system may request a confirmation that the user is away, for example via a notification to a user's phone. A failure to confirm may trigger a check for activation of any of the other sensors, with a negative result suggesting human absence and a positive result indicating PIR failure. A notification of this may then be sent to the user.

Figure 19:
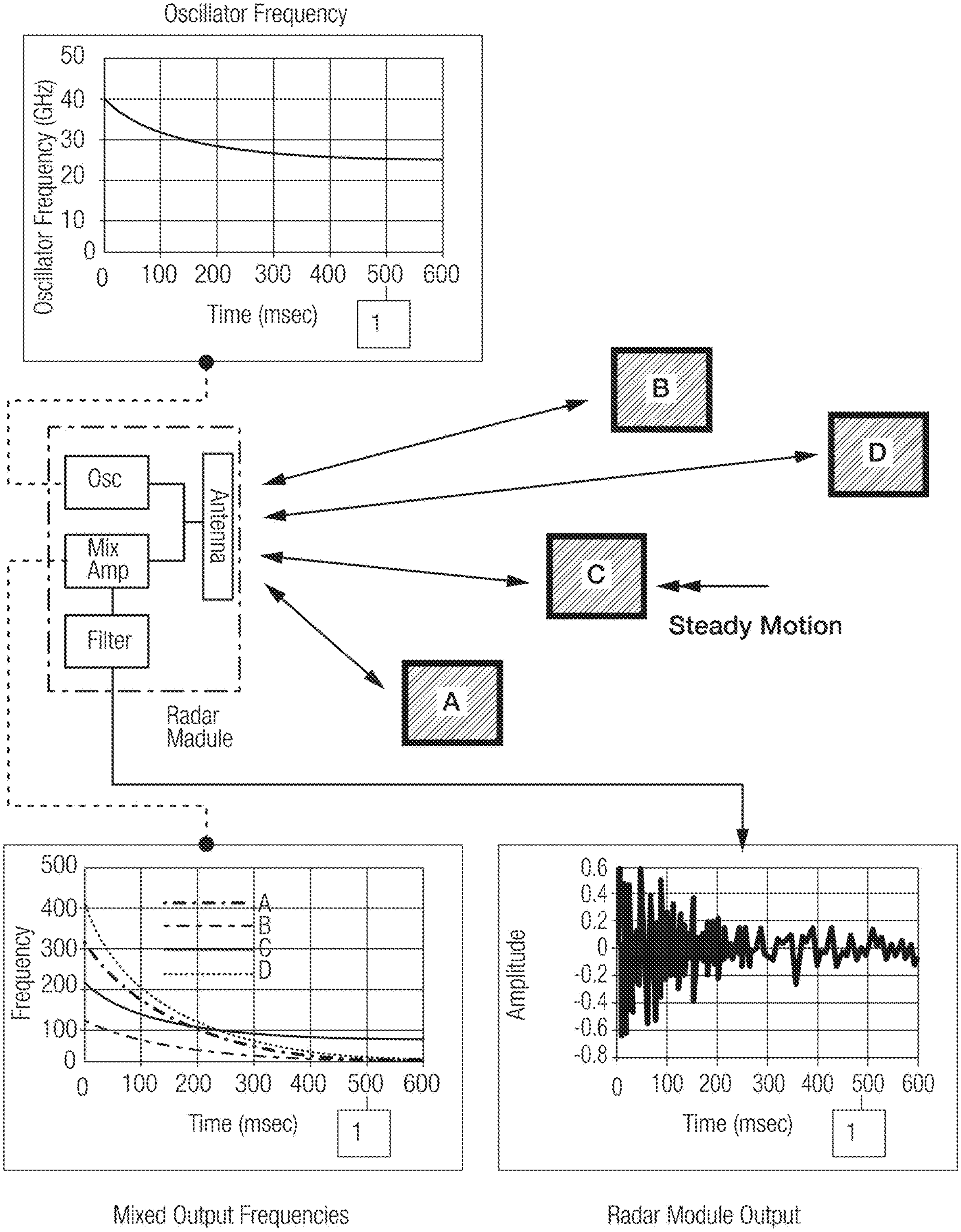
FIG. 19 is an illustration of one example of a radar module of the hazard detector according to the present disclosure.

In another embodiment, a radar sensor may be included in a hazard detection system. A radar sensor, application realized, may include a burst of noise in the radar output lasting perhaps half a second when initiating a radar sensor. A radar receiver is a heterodyne device mixing the returned radar signal with a local oscillator and outputting any differences. On start-up of the radar, the local oscillator frequency (same as the transmitted frequency) has not yet stabilized and so the return signal is not at the same frequency as the local oscillator signal causing this burst of noise. The noise will occur and then fade away if the components of the radar are functioning correctly, a monitoring of this noise, may be utilized and included to confirm that the radar is working correctly in a self-monitoring system. FIG. 19 illustrates radar at start up. The radar module is shown (center left) along with 4 objects that are illuminated by the radar (indicated by grey arrows) labeled A to D. Objects A, B & D are stationary while object C is moving steadily towards the radar module. On start-up, the oscillator (which generates an outgoing microwave "beam") frequency is not correct and over about half a second the frequency drifts to the correct value. This is shown in the small graph top left. The further away the reflecting object is, the higher will be the frequency at the mixer output. In the drawing, object D is furthest away and so it produces the highest output frequency and so on for the other objects. The small graph lower left shows the frequencies at the mixer output, produced by the reflecting objects and all go to zero at time tw except the signal due to object C. This is because object C is in constant motion towards the radar, so there is a frequency shift, due to doppler effect, in the reflected microwaves. This translates to a constant frequency output from the mixer where the frequency is proportional to the velocity of object C. The small graph at lower right shows the output of the mixer which, once digitized, is sent to the PIC processor. Shown is a burst of noise as the radar starts, fading away to leave a sinewave output at times longer than tw.

In some embodiments, a radar sensor may be controlled to switched on, a measurement made, and then switched off as a result is obtained. Exemplary events that will cause the radar to be switched on include initial appearance of a flame, sudden changes in a monitored flame, and a human detection by the PIR in certain modes of operation. Once a human is detected, that detection may be configured to remain valid for a period of time (for example 10 seconds, or other time as appropriate) and a flame event that occurs during this period may be declared to be "friendly." In certain modes of operation, the 10 second human memory can be extended by a PIR detection occurring while the memory is still valid and this suppresses further radar use until the human memory has finally cleared. A PIR detection also has a memory (for example 20 seconds) and further PIR detections within this period may be suppressed. The combined provisions ensure that in a space where a human is constantly present, the minimum use of radar may be achieved while being reassured that a human is present.

Some embodiments may include methods and system for a UVC sensor in a hazard detector 10. A hazard detector 10 may include a dynamic (on the fly) adjustment of drive parameters to control a UVC sensor for fast response to the appearance of a flame. A hazard detector 10 may be configured for setting of drive parameters to obtain best performance at minimum current drain. A hazard detector 10 may be configured for establishing a known Refresh Rate for compensation for saturation, thus accurate measurement of UV. A hazard detector 10 may be configured for adjustment of Refresh Rate to provide Electrical Leakage diagnostic data. A hazard detector 10 may include a Duty cycling of a UVC sensor when a flame is stable to conserve battery life. A hazard detector 10 may be configured for an intelligent use of radar.

Figure 17:
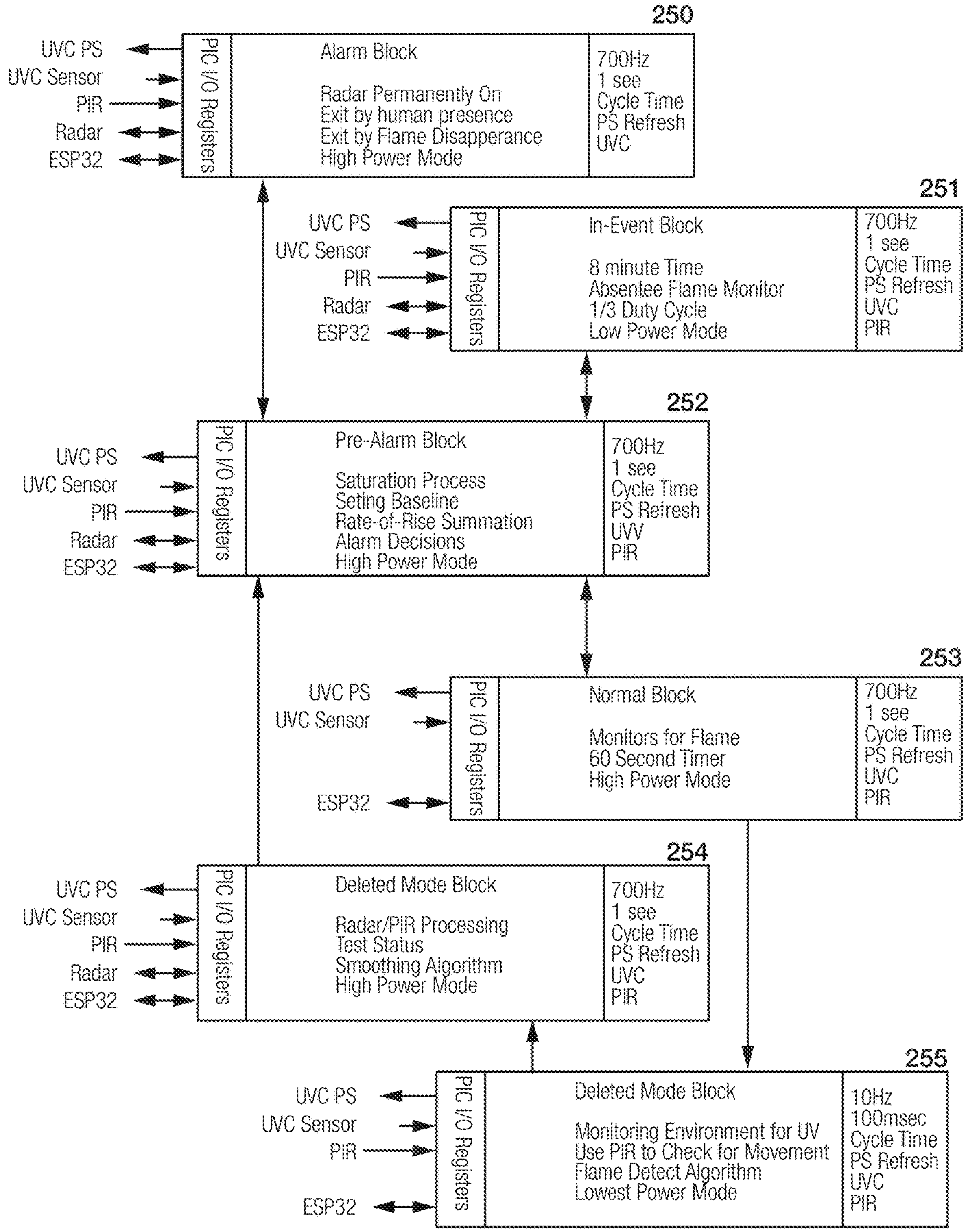
FIG. 17 is a block diagram exemplifying one example of a hazard control module for a hazard detector according to the present disclosure.
Figure 18:
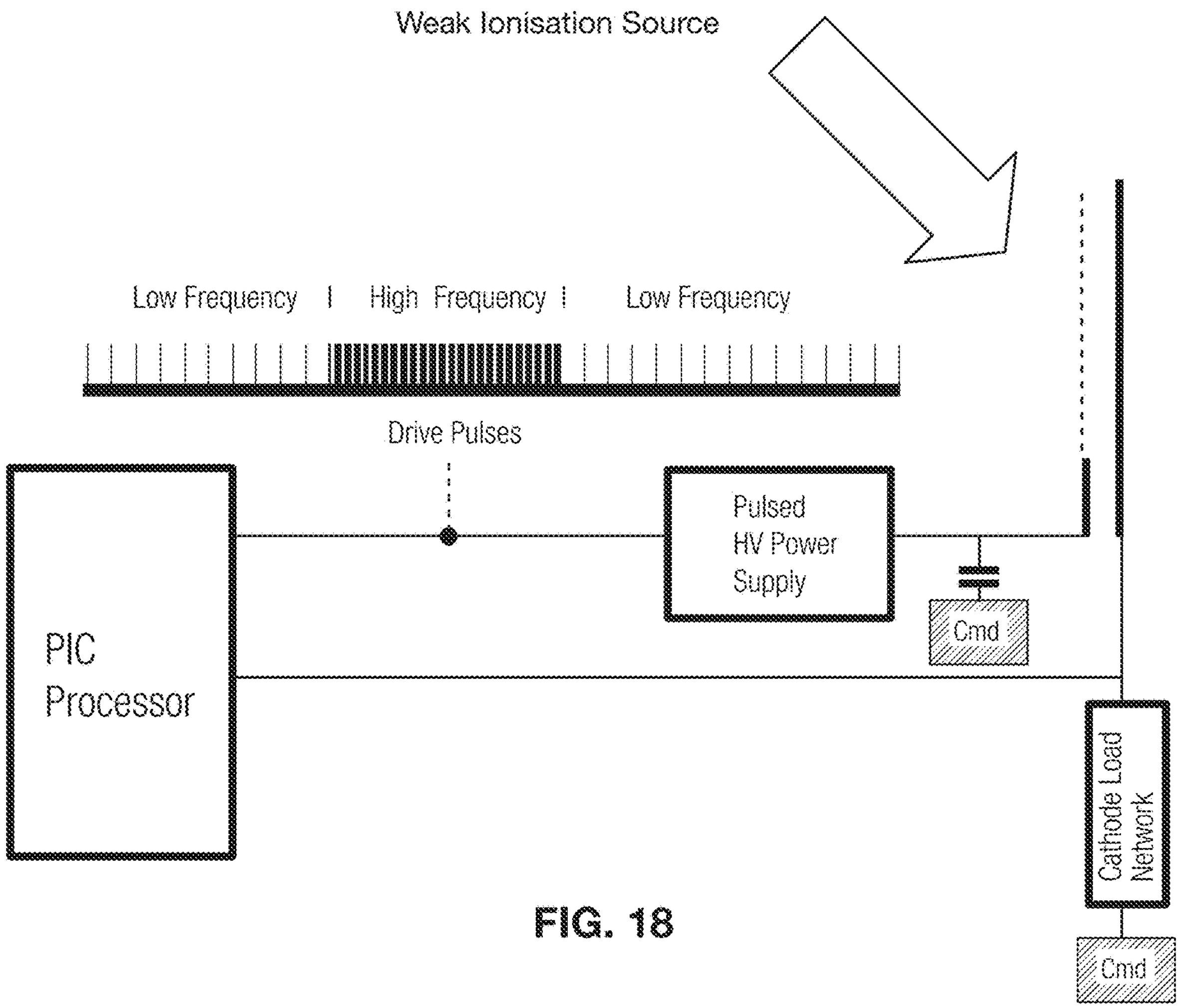
FIG. 18 is an illustration of one example of a hazard control module monitoring in one example a refresh rate according to the present disclosure.

FIG. 18 (see also FIG. 17) illustrates an active process for monitoring electrical leakage on a circuit board using comparison between count rates at low Refresh Rate (LF on the drawing) and high Refresh Rate (HF on the drawing). A low count is produced by a weak ionization source, this test will work best with low count rates so as to minimize saturation effects. The source could be a small or distant flame or it could be due to cosmic rays or background radioactivity. A PIC controller would be operating with a low Refresh Rate because the algorithm in Default mode is not receiving sufficient counts to move to Detected mode. The test commences, under control of the PIC, when the firmware sets the correct pulse pattern for the LF segment and makes a measurement of the average count rate, probably in counts per minute because of the low intensity source. The measurement will take a few minutes in order to collect enough UV pulses to obtain an acceptable standard deviation. The Refresh Rate is then raised to the frequency chosen for the HF segment of the measurement (with pulse width set as appropriate) and a second measurement is made (again taking a number of minutes) and the Refresh Rate is switched back to its LF value and a third measurement is made. The before and after measurements at LF are averaged and recorded. The graph at the bottom of the page shows the result of 30 cycles of measurement which is likely to occur over a period of months. As shown, the standard deviation on each measurement is between 0.25 counts per minute and 0.5 counts per minute and it is when many sets of readings are collected and a trendline can be drawn (dashed and dotted lines on graph) that a decision can be made. As drawn, there is a clearly different slope to the two fitted lines with a difference A existing between the lines after 30 cycles of measurement. This indicates that there is an increasing level of electrical leakage on the PCB which when A gets past a set threshold will trigger a message to the user and the Invention may enter a faults condition.

In some examples, a UVC may be considered a sensor using a combination of photo-electric effect to control wavelength sensitivity of the sensor and avalanche breakdown to amplify the signal. A sensor based on avalanche breakdown uses a pulsed power supply where the power supply voltage is reduced to zero each time avalanche breakdown occurs and then re-instated again once the discharge stops. The output of the sensor is a series of current pulses with each pulse representing detection of a single UV photon. A brighter UV source will produce more current pulses per second, so the pulse rate from the UVC sensor is a measure of the brightness of the UV source.

A hazard detector 10 may include an on-board microprocessor to provide drive pulses to a pulsed high voltage power supply at a rate determined by algorithms embedded in the microprocessor so as to obtain best performance at minimum current usage. In some examples, a hazard detector 10 is adapted for adequate power supply for at least 1 year (8760 Hours). This may be achieved by duty cycling the pulsed high voltage source, when the Refresh Rate is 700 Hz, at 33% so as to reduce the current drain from 360 mAhr per year to 120 mAhr per year, saving 10% of the annual current budget.

A hazard detector 10 may include at least two control outputs from a processor that may be used to change the way a UVC sensor is powered, the Refresh Rate and the specific pulse pattern for each time the voltage is refreshed (Refresh Event). The pulse pattern determines the peak voltage from the pulsed power supply and by changing the pattern, the voltage applied to the UVC sensor may be adjusted. Likewise, changing the Refresh Rate may change the range of UVC brightness over which the detection system can operate. In some examples, setting of these two parameters may be a dynamic process, subject to updated X-times per second, by way of example 10 times per second, which is an exemplary primary cycle time of a controlling firmware. At the end of each 100 msec period, the sensor (UVC, radar and PIR) inputs may be evaluated and a decision determined as to the suitable UVC sensor drive pattern for the next 100 msec.

In some instance, there may be a trade-off between a Refresh Rate and a maximum brightness of UVC source that can be measured (the maximum UV Pulse Rate). It is difficult to obtain pulses from the UVC sensor at a rate higher than the refresh rate because, once a UV pulse has been detected, a voltage on the UVC sensor may be too low for the sensor to operate, and this condition may remain until the next Refresh Event. As a UV Pulse Rate rises above about 10% of the Refresh Rate, the pulse rate starts to diverge from being proportional to the brightness of the UVC source. Initially this divergence is not large, but when the UVC pulse rate is above about 40%, the true UV brightness is several times what would be inferred from the UVC pulse rate. This saturation has been measured and modeled by Applicant. Saturation may be controlled by increase of the Refresh Rate and/or lowering of the voltage applied to the UVC sensor, each or both of which may be included in embodiments herein.

A hazard detector embodiment may include a communications module. A communications module may include multiple communication channels, by way of example WiFi (to a local modem and to the internet and/or a user's phone). A hazard detector may include a communication link, for example an I2C serial port for "wired-in" applications and/or parallel link, an on-board loudspeaker allowing indication, warning and voice communication, and a multicolor LED signaling system for warning and indication. Examples include, a hazard detector able to detect the appearance of a flame, check whether a human is present when a flame was created, measure the size of a flame signal, and/or then monitor a flame over time, measuring changes in a flame, and communicate changes to the user. A hazard detector may also be configured to monitor a flame while the user is absent, remind the user at intervals that the flame still exists, and react if the flame suddenly increases in size or disappears. Events may be logged to the cloud with complete traceability of records back to a specific hazard detector.

A hazard detector 10 may include a hazard detection control system. A hazard detector may include a hazard detection module. The hazard detector 10 may include one or more, and preferably two microprocessors. In instances of two or more microprocessors, an internal communication channel may be included for connecting the two or more microprocessors. A first processor may handle an interface between one more, and in some examples three, sensing devices. The first processer may be configured for: implementing an alarm, control algorithms and low level decisions. A second processor may be configured for handling higher level decisions and communications. In some examples, a second processor may include facilities for WiFi communication.

In one example, a first microprocessor may be a PIC processor (from Microchip) configured to handle an internal functionality of the hazard detector 10. By way of example, a first microprocessor may be programmed to run the hazard detector 10 algorithms and collect input from sensors included with a hazard detector 10.

A second processor, by way of example may be an ESP32 (as an example from Espressif Systems), and may include an in-built WiFi Transmitter/Receiver. The second processor may be configured to handle and process an external communication. By way of example, the second processor may include a sound connection to a sound processor with embedded voice and other sound files (by way of example, alarm and/or other noises used for notification), a controller chip to drive a color LED display. In some examples, preferably a 3 color LED display. The first and second processors may be connected by a serial link for internal communication.

The hazard detector 10 may include a firmware component adapted to control hazard detector 10, (see FIG. 17). A control firmware for a first processor may implement a series of hierarchical states with transitions between states determined by a number of algorithms.

In one embodiment, to transition between a Default (no UVC present) and a next state (Detected) an algorithm may be configured to provide rapid and reliable detection of low UVC levels. Return back to the Default state may be by a timer triggered by the disappearance of a detected UV signal, the timer provides a delay in case the loss of signal is produced by the user moving in front of the flame. Once in the Detected state, the Motion sensing system may be interrogated to determine if a human is present and if not, the state may transition to an Alarm state. If a human is present, the cloud may be interrogated to see if the Test function has been activated, and if not, the state may transition to a Pre-Alarm state. A task when this state is entered is to check that the flame is within tolerable limits. It is while in the Pre-Alarm state, in this example, that the first measurement of the brightness of the UV source may be made, and the standard deviation of successive readings from the UV source is measured. Once this has fallen to a preset level, the flame may be declared to be Stable and a Baseline is determined, along with upper and lower bounds. The state may transition to an In-Event. Reaching this point, for example, may generally take about 20 seconds to 30 seconds after the flame is recorded. In the In-Event state the user may be allowed to leave the vicinity and the flame be continuously monitored, with the user reminded that a flame is still present, via his phone, at regular intervals. Should the UV signal exceed the upper or lower boundaries, the state may return to the Pre-Alarm state, which will then assess the rate of rise/fall of the UV signal, check the motion detection system, and make decisions as to where to proceed next. There may be different thresholds for the human detection system depending on the rate-of-rise of the flame signal, the faster the flame is rising, and in turn the higher the threshold for confirmation of a human presence. Exemplary outcomes may be: human present-reset the Baseline and limits, human absent and UVC signal continuing to increase-go to the Alarm state, human absent and UVC falling-reset Baseline and limits, human absent and UVC disappeared-Notify users phone, human present, and UVC disappeared start timer to return to the Default state. This series of checks-and-balances provides an "intelligent" (informed) reaction to the situation, signaling hazardous conditions reliably without annoying the user with continual alarms and notifications.

Figure 21:
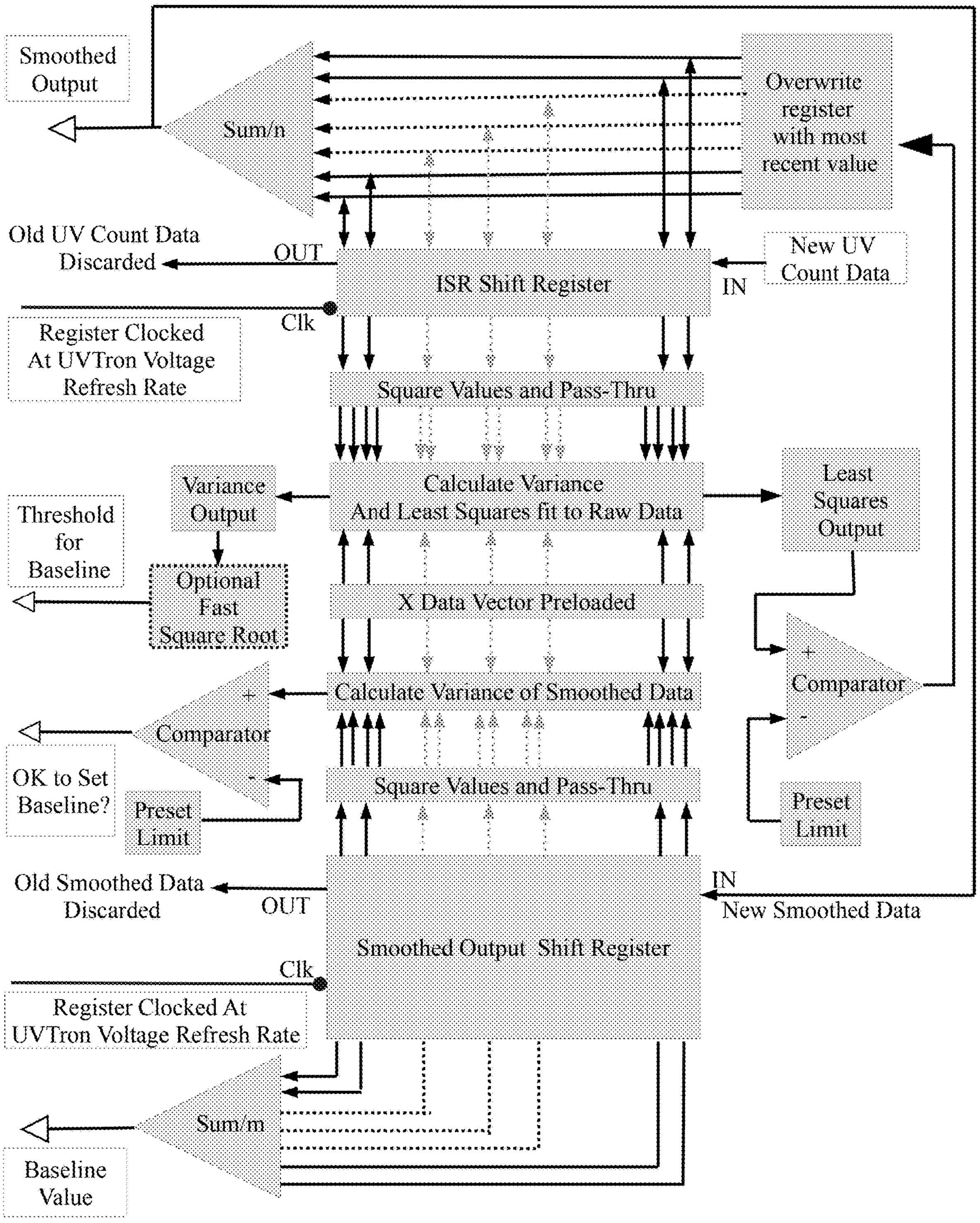
FIG. 21 is a block diagram illustrating one example of a flame overwrite in a hazard detection system according to the present disclosure.
Figure 22:
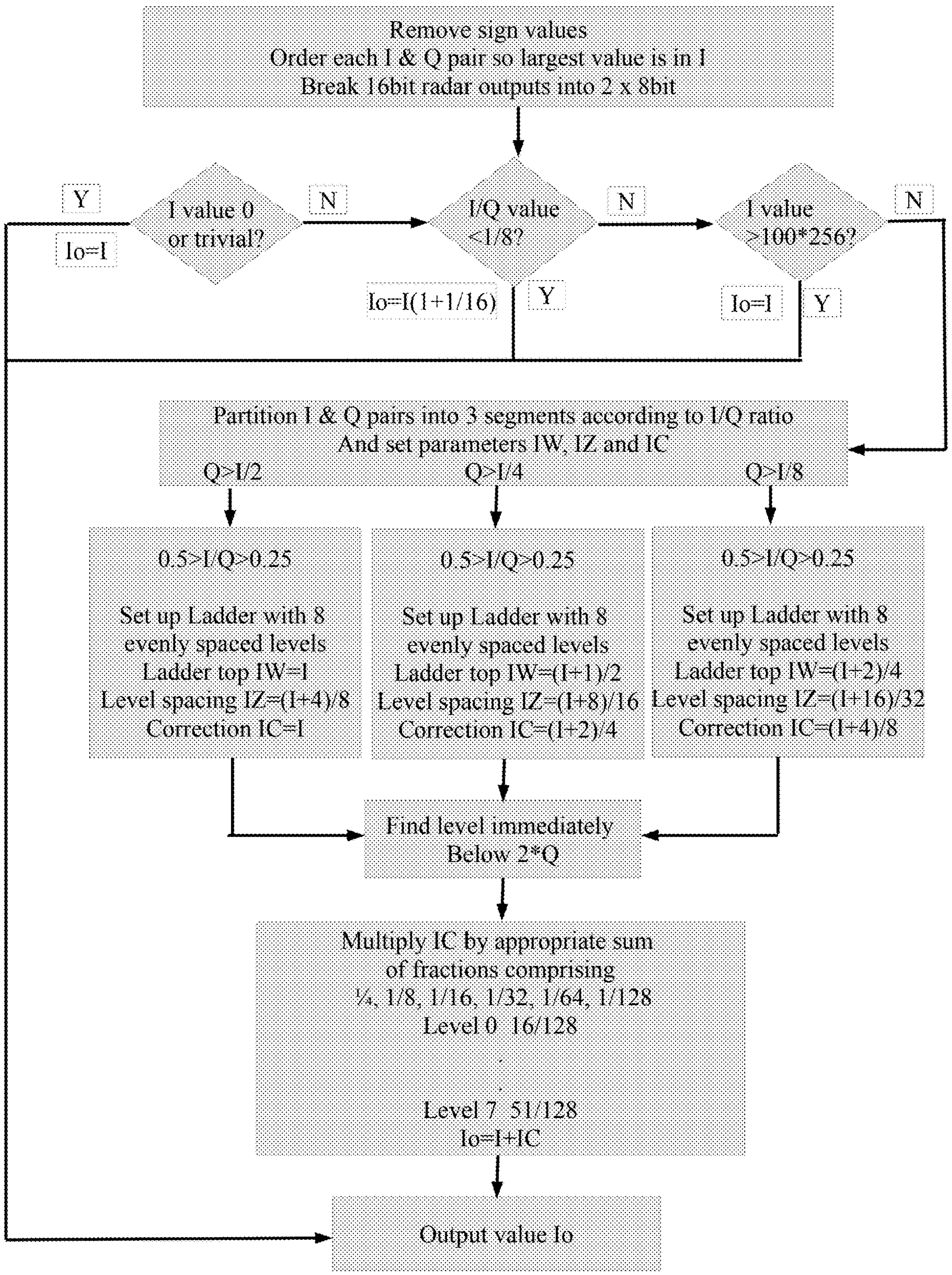
FIG. 22 is a block diagram illustrating one example of a radar in a hazard detection system according to the present disclosure.
Figure 23:
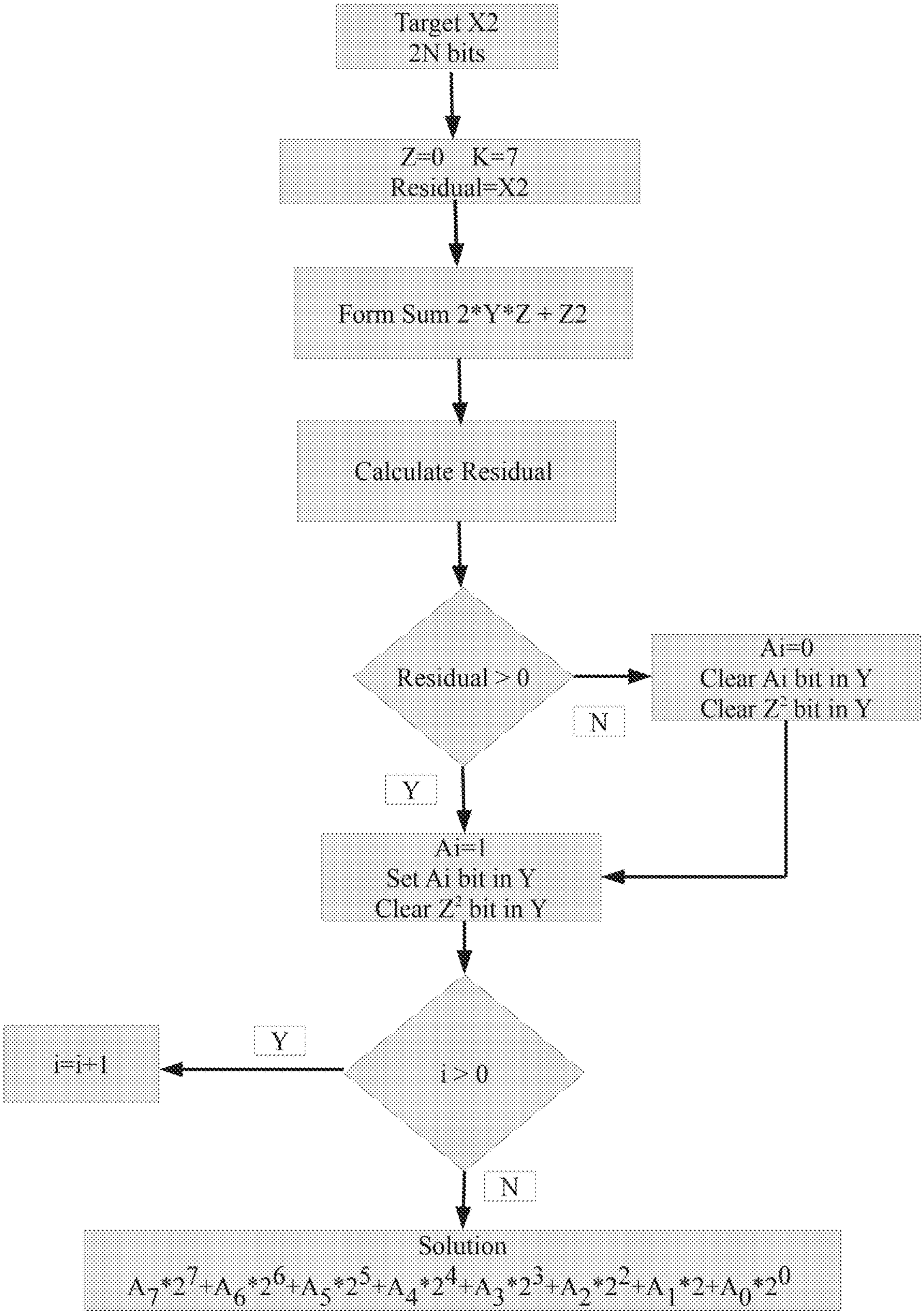
FIG. 23 is a block diagram illustrating one example of an algorithm for the control system by way of the PIC registers according to the present disclosure.

In some examples, the firmware component includes a hierarchical firmware, with a central Pre-Alarm block responsible for at least a portion of the decisions making. The other blocks may be concerned with specific functional parts of a behavior of the hazard detector 10. In this figure example, the right-hand end of each block shows the background operations occurring while control is in that mode. This includes generating the Refresh pulses for a UVC power supply, controlling the cycle time for the process, and polling a radar and PIR for new data. These operations may operate independently of a main part of the firmware. These operations may awaken a processor from a deep sleep state. The left-hand end of each block shows exemplary services called from the corresponding block. The "Smoothing Algorithm" which is shown in the Detected Mode Block may occur as a separate section of the firmware called "Update ISR." By way of example, this may happen automatically in all blocks above this particular one. FIG. 21 illustrates one example of the structure of the ISR algorithm with connections to other parts of the firmware (in one example, shown in the white boxes). The algorithm can be implemented in hardware but is preferably implemented in firmware in some embodiments using the internal registers of the PIC. An initial state of the firmware may be the default state which, is the state where control is likely to reside for more a majority of, for example, more than 90% of the time. This represents a state where no flame is present in the environment, and the hazard detector 10 runs at its lowest power mode.

Figure 9:
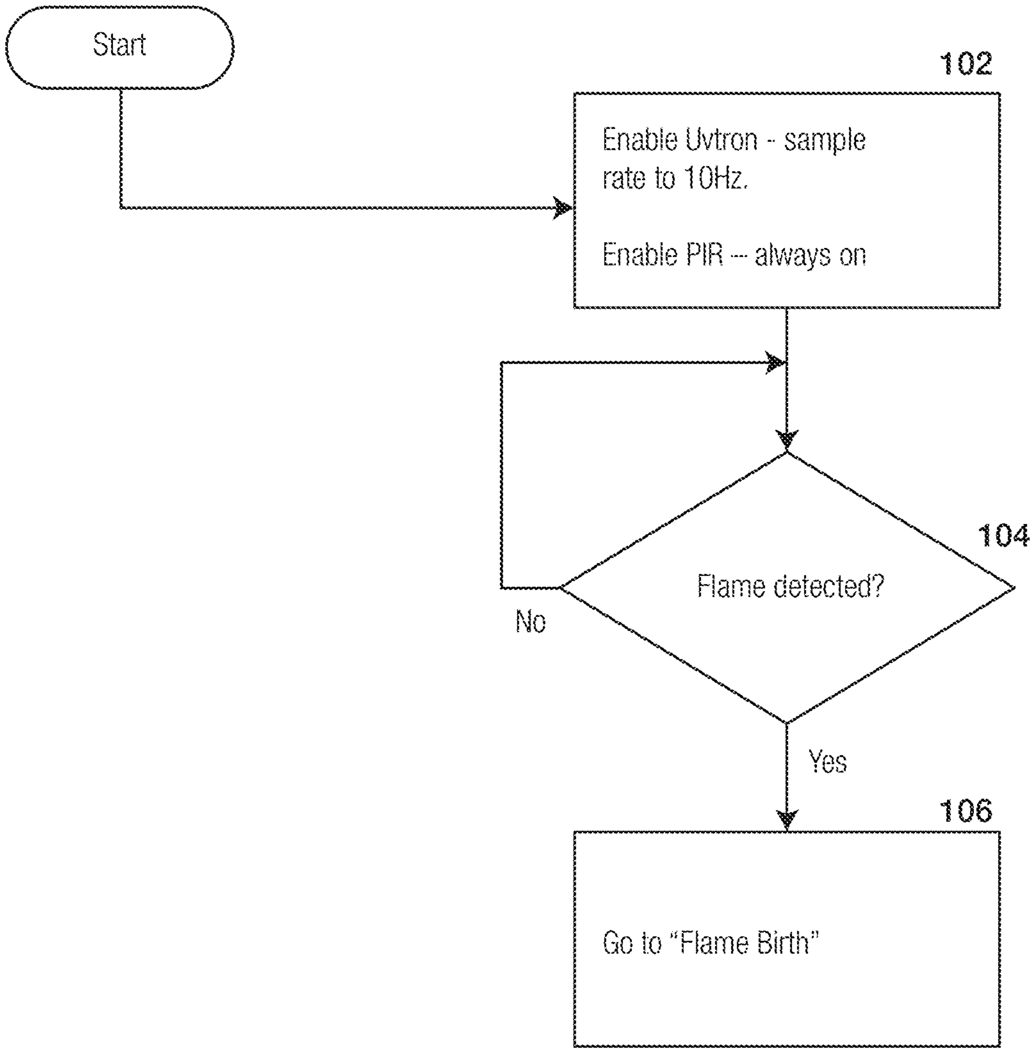
FIG. 9 is a block diagram exemplifying one example of a hazard detector in use according to the present disclosure.

In some embodiments, a Refresh Rate is 10 Hz, the radar is not used but the PIR will be in operation as it has negligible power usage. In yet another embodiment, a refresh rate may be 20 Hz. The UVC sensor may generate a pulse every time a UVC photon is detected, which is summed in an input register of the PIC. The PIC, which is in deep sleep most of the time, is woken 10 times per second by a hardware timer to carry out a routine that may include portions and/or all of: checking the input register for notice of the detection of a UV photon; refreshing a high voltage supply to the UVC sensor (by way of example emit 2×4 μsec pulses) from a DIO pin; and, process a new UVC data through an algorithm to determine detection of a flame. FIG. 9 shows one example of a PIR sensor and sample rate of 10 Hz 102 with a flame detected 104 progressing to a flame birth indication 106.

Figure 20:
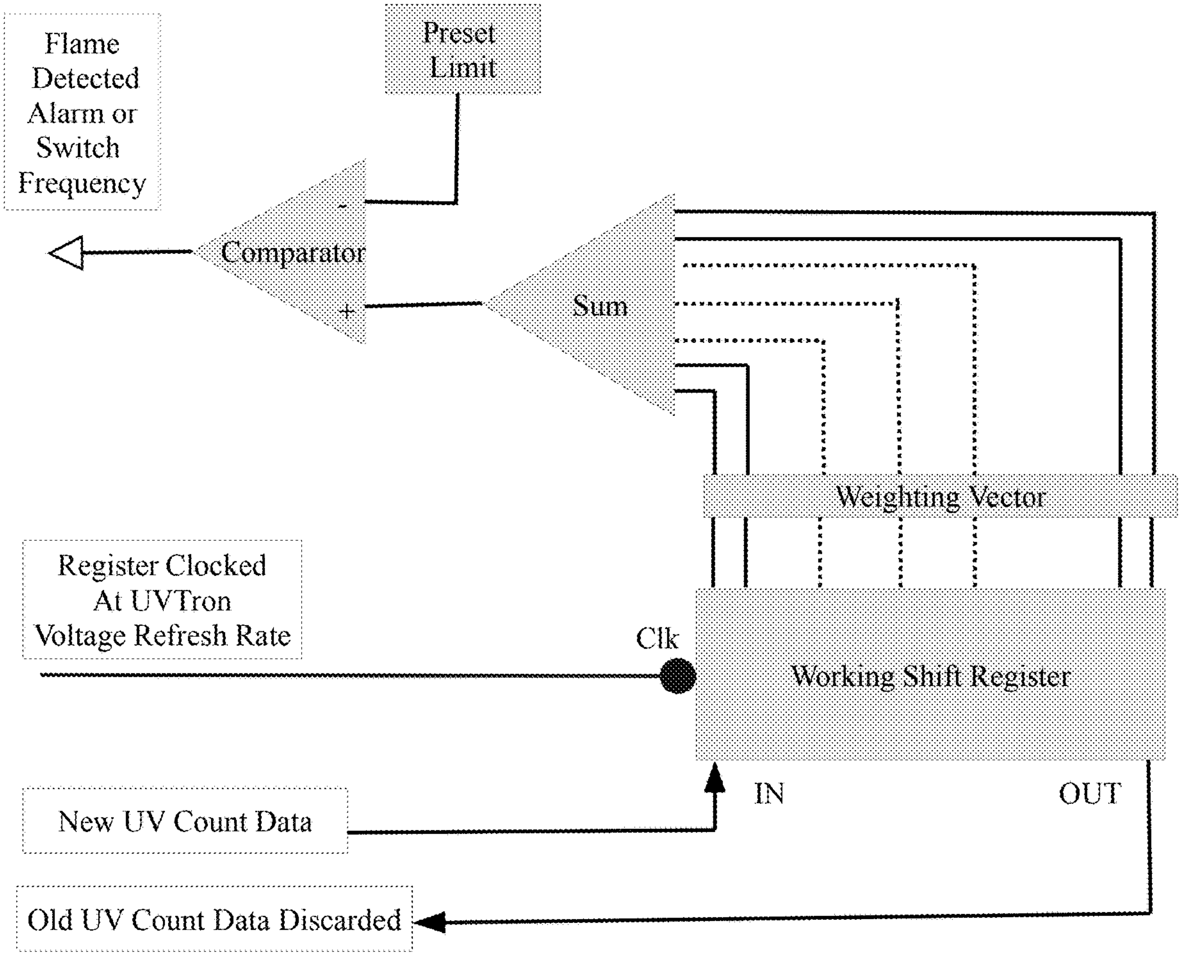
FIG. 20 is a block diagram illustrating one example of a hazard detection system algorithm for hazard detection according to the present disclosure.

The PIC is kept in deep sleep for as much time as possible to reduce its current consumption in some examples. The algorithm for flame detection may include a simple linear filter designed for rapid response and minimal false triggering. Such an algorithm, as shown in FIG. 20 includes a short shift register (less than 16 locations) that is advanced one position every 100 msec with the new UV data added into the vacant location at the source end and the data shifted out of the register discarded. A summation of the contents of the shift register may then be made, modified by a weighting vector, which multiplies all but the two end locations by 2 and the end locations by 1. The summation is then compared to a preset limit, which by way of example may be set, for example 4, and in other examples 7, with still other configurations of the weighting vector and limits within the scope of this disclosure. If the summation exceeds this preset limit, it is determined that a flame has been detected. To support detection, in some embodiments, at least 2 UVC photons have to have been detected in any 1 second interval.

The hazard detector 10 may be programmed to contact a second processor (ESP32) to send either a push notification to a user's phone, or signal via serial link that a hazard, such as a fire, has been detected. In some embodiments, such as commercial applications, notification of hazard detection in a specific location may be included, and in other embodiments an audible warning consisting of a siren and or voice notification may be sounded and warning lights may be flashed. The event log, in the cloud, may also be updated.

Upon confirmation of detection of a flame, the firmware may switch to the Detected mode, a change that may happen in the next 100 msec cycle after confirmation of UVC detection, providing a rapid response to the appearance of a flame. In this example, in all other modes, besides the Default mode, the Refresh Rate to the UVC high voltage supply is increased to a much higher rate, typically 700 Hz, but it could be frequency up to that limit in different embodiments. The pulse pattern to the high voltage power supply may be adjusted to 2×3 μsec pulses (for a Refresh Rate of 700 Hz, other patterns will apply at other Refresh Rates) to maintain the UVC sensor voltage at the correct level.

At this point, the main cycle time of the firmware may be changed from 100 msec to 1 second as the operation of the firmware now becomes more complex with considerably more signal processing. One exemplary exception to this is the radar which is still polled every 100 msec. At this higher Refresh Rate, the hardware timer may be adjusted to wake the PIC for every Refresh Event and after completing the tasks required in the new mode the PIC may be returned to a deep sleep.

Upon entering a detected mode, an initial task may be to notify the second processor (ESP32), which in turn, commands the sound module and/or visual (LED) control module to emit a sound, such as a "friendly chime," to let the user know that a flame has been detected. A second task may be to initiate the flashing of an LED to let the user know that a flame is being monitored, the flashing, in some instances, may continue until the flame is extinguished. The period between flashes, in some examples, be from 1 to 10 seconds, and in some embodiments may be preferably 3 to 5 seconds. The PIC firmware may also initiate a radar use, in some examples, with a maximum length of 10 seconds, in order to detect any human presence. The radar output may, in this example, be programmed to be read 10 times a second, processed, and a decision made about human presence based on whether the radar return is above the detection threshold (base threshold examples may for example be set at 200 to minimize false detection). The radar utilizes a heterodyne mixer and its output format consists of pairs of values for each radar reading, each pair is formed of an I (in phase with local oscillator) and Q (in quadrature, 90 degrees phase shifted, from local oscillator) term. To obtain a radar return value it is necessary to calculate the square root of the sum of I squared and Q squared where I and Q can both be 16 bit numbers. Although it is possible to avoid the square root process (time consuming on a PIC processor) and use the squared value, it is preferable to use the rooted value as this is linear in radar signal. A special routine has been developed which can rapidly produce the desired output and it is shown in the FIG. 22. This process estimates the square root with an accuracy of typically 2% which is sufficient for reliable human detection. The process uses the value I/Q (which is less than one because of the initial sort step) and is divides the I/Q values into 3 bands plus a 4th band where I/Q is less than ⅛ where a simple approximation is applied. Each of the 3 bands is further subdivided into 8 sub-bands, each associated with a different correction factor. The process involves first selecting the correct main band and then the correct sub-band requiring a maximum of 11 simple comparison operations which can be implemented very compactly on a PIC processor. The correction at each level is comprised of a short sum of fractions of powers of 2, which means that the correction can be simply computed by adding a short (max 4) series of right-shifted values and then is added to the initial value of I to form Io, the radar return value suitable for detecting a human. Detection of a human may initiate the radar to stop and a "human flag" set to "human present", while if the radar use times out the "human flag" may be set to "human absent". While the radar is in use, the "human flag" may have an exemplary value human present. If the "human flag" is set to "human present", it may remain in that state for a period, for example 10 seconds, and if not refreshed the "human flag" may return to an empty or undetermined value state.

A visual light module may include in some examples a visual detection signal. A LED color, for example, may change depending on the whether a flame detected is considered occupied or not. For example, a flame seen without a human in the space (hostile) may flash the LEDs red whereas a flame seen with a human in the space may flash the LEDs blue (friendly flame). In this way, examples may produce in an event a visual indication of how the device detected a hazard, what was detected, and/or occupancy of the space.

The hazard detector 10 may be programmed to classify all flames as either "friendly" or "hostile". A hostile flame may be defined as one that was initiated without a detected human presence, and/or a flame that changes significantly in brightness without a human presence detected. A flame will also be declared hostile if the UVC count rate is above a preset threshold (by way of example 650 cps), and the radar return is below a higher threshold (by way of example 1000). At this flame size, a more definite confirmation of a human may be required than it would be if the flame was below this threshold size. A count rate of 650 cps may indicate a fire that is larger than typically 15 burners on a kitchen range turned on at the same time.

Once the presence of a flame is established, a smoothing algorithm may be started to provide a clean level to simplify measurement of flame brightness. The algorithm may be considered in some examples, a running point average of the UVC input, for example a 16 point running average, and/or a running average between 10 and 20 points. This may be achieved by using a shift register in a manner similar to that described for the algorithm to initially detect a flame, however, in this case the summation over the register contents produce a simple average.

In one example, further shift registers keep the last 16 values of the algorithm output and the standard deviation of the raw UVC data and these are also updated every second. The equations to calculate standard deviation can be found in any statistics textbook, however, here the formulations are in a modified form for the system. The ISR algorithm initially computes the Variance of the raw UVC data (the square of the standard deviation) and this may be used in control of the processes of the invention. However, in one example, the standard deviation of the UVC data may be used and so a special fast square root process has been developed that takes advantage of the structure of the PIC registers (see FIG. 23) to speed the routine by making it more compact and means it runs faster than conventionally for efficiency. On an 8 bit PIC processor it may be calculated that the whole process to for square root of a 16 bit number is 99 instruction cycles, typically 3.5 μsec. The algorithm may contain, in some embodiments, a feature, wherein a least squares linear fit to the last 16 values of the incoming UVC data (stored in the shift register) to extract a value for the rate of rise. The purpose of this, in certain examples, is to improve the response of the algorithm to sudden changes in the UVC data, for example as may be caused by turning on a second burner on a kitchen stovetop.

In some examples, without this addition, the algorithm may require 16 seconds to reach the higher level, but if the rate of rise of the raw UVC data is large, the data in the algorithm shift registers (including the register containing the last 16 values of the raw UVC data) is overwritten by the latest raw UVC data point. This provides a pathway to reduce a lag between an algorithm output to a second or two and overwriting the data in the UVC input register ensures that the rate-of-rise goes back to near zero immediately after the correction.

In a scenario where a flame is determined to be hostile, the hazard detector may notify the second processor, which may log the event in the cloud, and then the PIC firmware may immediately move to an Alarm state. If the flame is determined to be friendly, a message may be sent to a second processor, which may log the event and may be set to query the "cloud" to check if a "Test" flag has been set by the user. A "Test" flag may set by the user contacting the cloud, in one example via a phone. If a "Test" status is confirmed, the hazard detector 10 may monitor the flame for 5 seconds and then send a push notification (via the second processor) to the users phone informing of the result. The data may be again logged in the cloud.

Once the processes associated with "Test" have been completed, the firmware in the PIC may move to a next Pre-Alarm level, the mode in which real measurement of the flame brightness may begin. A first check may be set for saturation. In certain examples, a saturation threshold may be 450 cps. In some examples, count rates above this limit may have suffered too much compression (due to the effects of saturation of the UVC detection channel) to be measured reliably. If Saturation is detected, a second processor may be contacted to command an audio and/or visual indication of the saturated state, which may be continued until the UVC count rate falls below the saturation threshold. Saturation may be, in some examples, when a user first installs a hazard detector and has placed it too close to a flame source, but a check may be made occasionally and/or every time a flame is detected. If the saturation limit is exceeded, a message may be sent, via the second processor, to the users phone advising of the situation and/or requesting the user take a responsive action, by way of example, as moving the hazard detector further away from the flame source.

In examples where saturation is not an issue, a hazard detector 10 may use a smoothed UVC count rate to determine a real UVC brightness of the source. In some examples this is accomplished using an equation developed from modeling the saturation process with the modeled results compared with real measurements. To get the comparison data, a special UVC source was made with 6 individual sources all of different brightness. In the absence of the effects of saturation, the UVC count rate from each of these sources should maintain a constant ratio irrespective of the distance of the source array (overall count rates should diminish according to the inverse square of the separation between source and UVC sensor). By making a series of measurements of the 6 sources as the source array is moved away from the UVC sensor, it is possible to generate a curve for the saturation behavior of the UVC detection channel which is fitted to the theoretical model. This process generates a relation between real UVC brightness and UVC count rate that can be used to correct the measurements made by the UVC detection channel. In this embodiment, primary factors controlling saturation is the Refresh Rate and drive pulse pattern to the UVC sensor power supply, and since that is well defined, a single saturation curve can be used across hazard detectors.

In one embodiment, the inventions of the present disclosure include a hazard detector 10 configured to monitor flames for changes. In this example, monitoring and sensing a scenario where a towel comes into contact with a lit ring on a kitchen range hob (see FIG. 20 and FIG. 21). Another example is a pan on the hob that catches fire. In both cases, a flame from the hob (background flame) could produce a stable UV level which would suddenly increase and then decrease as the flammable material burnt (accidental flame) out. Applicant realized that one problem is that the effects of saturation could mean that the presence of a background UV level from a stove top burner could have the effect of reducing the size of the signal from the accidental flame, illustrated by the results of some of our testing. In certain examples, a refresh frequency may be 700 Hz.

Testing

Figure 24:
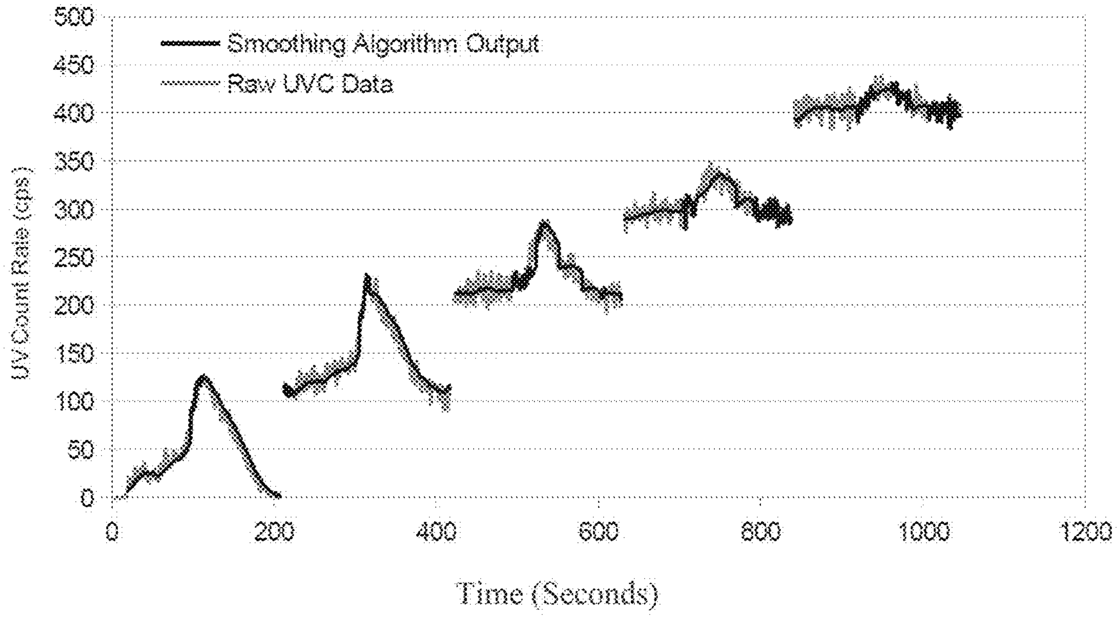
FIG. 24 is a graph illustration of examples of an Accidental Flame at Selected Background Levels according to the present disclosure.

In developing a standardized accidental flame, a paper towel was burned, and the accidental flame recorded in the presence of a background of 0 cps, 100 cps, 200 cps, 300 cps and 400 cps. A background UV was provided by a specially designed adjustable UV source that produced a repeatable noise free UV signal. 200 Second segments were cut out of each recording centered on the section containing the accidental flame. These segments together are shown in the illustration of Table 1. Table 1, as shown in FIG. 24, shows an illustration of Accidental Flame at Selected Background Levels. The accidental flame with no background is at left followed by successively increasing levels of background. The raw UVC data is shown by the grey trace and is quite noisy, caused statistical fluctuations in the number of counts recorded each second. Such noise will typically be present on recordings of raw UVC data. The black trace shows the output from the smoothing algorithm. The UVC count Rate of the flame signal with no UV background peaks at about 130 cps, while the signal from an identical flame has a height of only 30 cps when the background UVC Count Rate is 400 cps. For higher background levels, the compression of the accidental flame signal is even more severe and it becomes difficult to correct, resulting in a set saturation limit of 450 cps for UV background. If the hazard detector 10 measures a "friendly flame" (i.e. an intentional flame) with a Count Rate above 450 cps, a warning may be issued to the user with a request to reduce the UVC intensity by moving the Invention further away.

Figure 25:
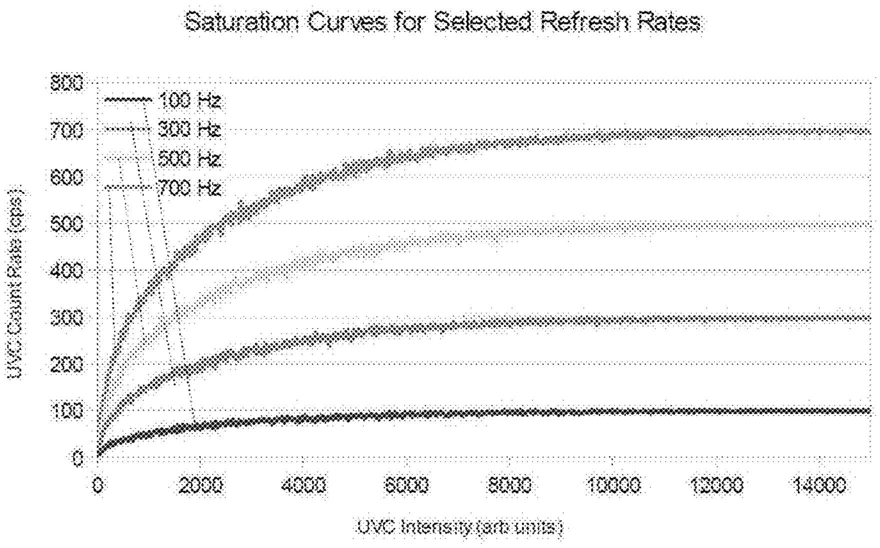
FIG. 25 shows examples of a Saturation Curve for Selected Refresh Rates according to the present disclosure.
Figure 26:
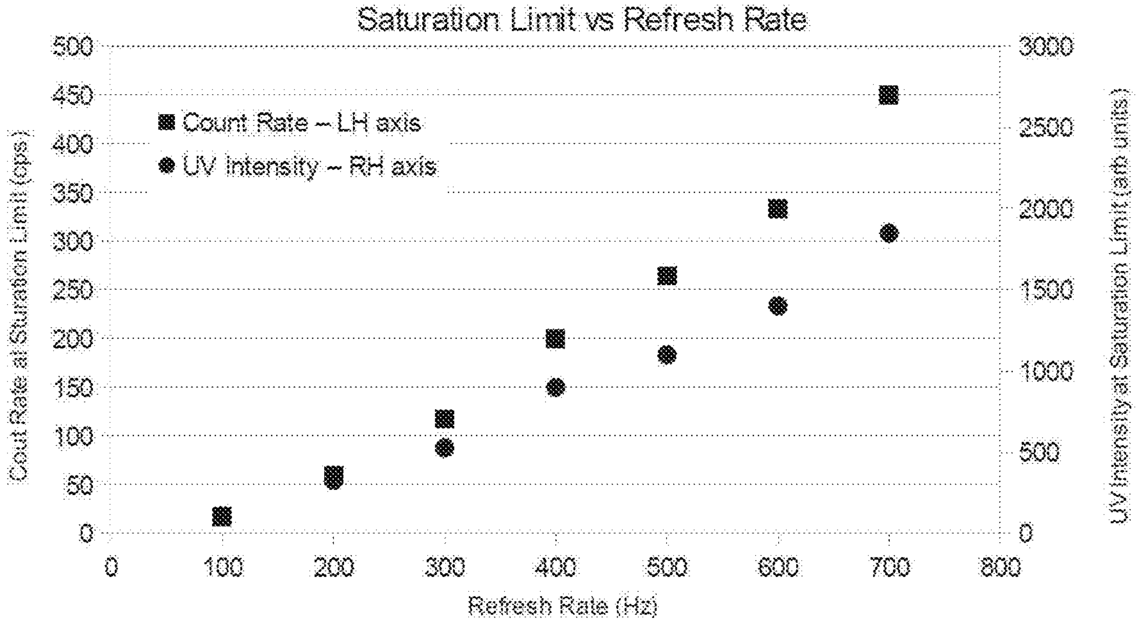
FIG. 26 shows examples of Saturation Limit versus Refresh Rate according to the present disclosure.

UVC Count Rate over a wide range of UVC levels was measured to establish Saturation Curves at a number of different Refresh Rates. The Saturation curve allows us to calculate the Output of the Invention for any applied UVC intensity and also to back-calculate from a measured UVC Count Rate to the intensity of the UVC source that caused it. Notice that the region of each curve, where it is bending towards horizontal is noisier than it is at both higher and lower UVC Intensities. This noise is caused by the same statistical fluctuations as previously mentioned. At very high UVC Intensities, the statistics may become certainties, a UVC photon will be detected in every Refresh Period and so the noise goes to zero as the curve reaches the highest UVC Intensity. Likewise at lower UVC Intensities, the UVC count Rate is small and so the fluctuations are also smaller. Plotting the standard deviation of the UVC Count Rate against the UVC Count Rate, the result is a distorted semicircle with the highest point at about 75% of the Refresh Frequency. If the experiment was repeated with a high voltage power supply that recharged the storage capacitor fully in a single Refresh Cycle, the curve of standard deviations would be a perfect semi-circle, with the distortion caused by limitations in the high voltage power supply. FIG. 25 shows a Saturation Curve for Selected Refresh Rates. With a set point of a saturation limit of 450 cps for a refresh Rate of 700 Hz, the gradient of the Saturation Curve may be measured at this point. The gradient of the curve may determine an increase in measured UVC Count Rate as a function of an increase in applied UVC Intensity. The gradient at the saturation limit for 700 Hz is just over 0.09 cps per UV Unit, there is difficulty in relating this to real UV brightness due to the UV level in the picoWatt range without a suitable power meter. Here, the criterion used is that the gradient of the saturation curve, for several Refresh Rates, must be above the value for a UV Count Rate of 450 cps at a Refresh Rate of 700 Hz. Taking a single example, at a Refresh Rate of 300 Hz, saturation will become a problem above a UV Count Rate of 120 cps or an applied UV Intensity of about 500. FIG. 26 shows Saturation Limit versus Refresh Rate. What is also apparent is that the Count Rate at the saturation limit is 64% of the Refresh Rate at 700 Hz, falls to 50% by 400 Hz and continues to fall reaching about 18% at 100 Hz. In examples, a Refresh Rate below 400 Hz is not preferable for a flame measuring application.

Continuing from the previous example, a control parameter "Flame Flag" comes into use, representing how a flame is changing. Flame Flag uses such exemplary values as "Rising Fast", "Rising", "Stable", "Falling", "Falling Fast", "Intermittent" or "Unstable". Intermittent and Unstable values of the Flame Flag may delay the setting of a Baseline and may indicate a human passing between the flame source and a UVC sensor. Rising Fast and Rising may indicate an out-of-control fire or that a second flame source has appeared, while the Falling and Falling Fast flags are associated with a reduction in flame size/brightness or number. The Rising and Falling flags may be set by the smoothed UVC count rate falling outside the window established by the Baseline process, but they may also be initiated by a rate-of-rise measurement. If the smoothed UVC level is increasing or falling at a rate greater than a preset threshold (for example about 1.5% per second), then the appropriate flag may be set. However, if the rate-of-rise is greater than a second threshold (for example about 5% per second), the Fast versions of the flag may be set. The value of Flame Flag also may control which of the radar thresholds is used for confirmation of human presence. Standard Rising and Falling flags may be interpreted in some examples as alarms can be canceled or prevented by a radar return of 200, while for the fast versions of these flags, the threshold may be higher at 1000.

In a Pre-Alarm mode, provided that the flame Flag is Stable, the firmware monitors the standard deviation of both raw UVC data and smoothed UVC data. In some embodiments, when the smoothed UVC data achieves a standard deviation below 1 cps a Baseline is set using the current output of the smoothing algorithm. This is then combined with a threshold value that has been calculated from the standard deviation of the raw UVC data, to define a window of Baseline +/−Threshold. Extensive modeling shows that the standard deviation of the raw UVC count rate is about 10 over a wide range of UVC brightness and this number may be used for the Threshold instead of calculating the real standard deviation, saving processor time. However, if the Flame Flag does not become Stable, control may remain in Pre-Alarm state while the situation is assessed. Summation of the rate-of-rise parameter (calculated as part of the smoothing algorithm) typically will have commenced, in this example, when control entered the Pre-Alarm mode with both +ve and −ve terms added to the summation at each firmware cycle. An internal limit may be set for the summation, which may depend upon the value of Flame Flag, for Rising flames the limit may be 300 and for Rising Fast it may be 1500. These limits may correspond to increases in flame count of approximately 15% and 75% respectively. Should these limits be breached, the current state of the human flag may be checked and the radar will be started if it is not "P". If the radar return is still not "P" as judged against the appropriate threshold, control may move to the Alarm mode. If a human is detected, the summation of rate-of-rise may be cleared and restarted. It is unlikely that a user will be in the same room as a growing flame, but monitoring may continue just in case.

In this embodiment, the rate-of-rise summation is added/subtracted while in Pre-Alarm mode and the summation is held at its current value in other modes except Default mode where it is cleared. Provided there are no unusual conditions the hazard detector 10 may spend a few tens of seconds in the Pre-Alarm mode before moving to the "In-Event" mode, where control will stay during the time that the Flame Flag value is Stable. While in the In-Event mode duty cycling of the UVC sensor may be used to control current consumption, the Human Detection Subsystem may be engaged, with the hazard detector 10 checking for human presence and flame stability. During the time that human is perceived as being present, the hazard detector 10 may take no further action, but if it is perceived that a human has left the area, a countdown timer may be started, for example with an initial value of 8 minutes. When that timer times-out, a second processor may be contacted to send a push notification to the user, for example by phone and/or application, reminding the user that a flame is still alight in the monitored room. A further minute may be allowed for a user acknowledgment of the notification. The result may be recorded in the cloud.

Alternatively, provided that the flame remains Stable, then no further action in coordination may invoked.

The Pre-Alarm mode (duty cycling of the UVC sensor may stop and the human detection Subsystem may be dis-engaged) may be re-entered if the Flame Flag changes from Stable while in the In-Event mode. Pre-Alarm mode may also be entered from the Detected mode and from the Normal mode. If there is a valid Human Flag still active then the presence of a human may be assumed, otherwise the radar may start to check for human presence. If a human presence is determined and if a flame is still present, the current Baseline may be cleared and an attempt to set a new Baseline started. If there is no flame present and no human is present, a second processor may be contacted to send a notification to the user, for example by phone, warning them of the disappearance of the flame, possible causes for which may include but not be limited to, a pan boiling over and extinguishing a burner, but the gas is still turned on, still representing a hazardous situation.

In some examples, if a person is present when the flame disappeared, it may be assumed that the human extinguished the flame and control will pass to the Normal mode. Normal mode may be a stepping stone for returning to Default mode, but the Refresh Rate may be maintained at a high level (for example 700 Hz nominal). Upon entering Normal mode, a countdown time may be started with an initial value (for example of 60 seconds) and the UVC sensor may be monitored for a re-appearance of flame. If the timer times out, with no flame detected then control returns to the Default mode, the Refresh Rate is lowered (for example to 10 Hz with a firmware cycle time of 100 msec). If a flame is detected while the timer is still active then control may return to the Pre-Alarm mode. This, by way of example, may happen if a user stands between a flame and the UVC sensor for a period of time. If the flame brightness falls within the window established by the previous Baseline, when control passes to Pre-Alarm, then the flame may be considered friendly, the Baseline re-instated and control returning to In-Event. This scenario may also be expected to be accompanied with indicators of human presence.

If the flame detected on returning from Normal mode does not fall within the window, then then status of the flame may be un-specified and a radar started to detect a human presence. If no human presence is detected, then control may move to Alarm mode and the radar may be run continuously. However, if a human presence is confirmed, the process setting a new Baseline may be initiated and once established, control may move to In-Event, as before.

Alarm mode represents the highest level within the hierarchy and typically is only exited by the appearance of a human and/or the disappearance of the flame. When control enters the Alarm mode, a message may be sent to a second processor which initiates an audible alarm signal via the sound processor, a visual alarm signal via a LED controller, and/or logs the event in the cloud via the WiFi and user's internet hub. The alarm signal may continue to be emitted until control exits the Alarm mode. While in Alarm mode the radar may be turned on continuously to look for a human presence using the threshold appropriate to the current state of the Flame Flag. With the Refresh Rate running (by way of example at 700 Hz), the warnings operative and the radar running continuously, Alarm is the mode with the highest power dissipation. On exiting the Alarm mode, control may pass back to the Pre-Alarm mode, where it remains unless typically the Alarm mode was exited because of the disappearance of the flame. In this case, control may pass rapidly to the Normal mode, and otherwise it may remain in the Pre-Alarm mode. The flame may be monitored to set a Baseline or possibly to re-escalate to Alarm mode.

One embodiment of the inventions of the present disclosure may be used in conjunction with an internet hub, a smartphone running a specially written App, and/or a website (the cloud). This combination may allow all of the features to be accessed, by way of example, features such as personalized voice messages, reception of push notifications, setting of Test status, "hushing" of the siren (while in Alarm, and voice instructions to facilitate initial system set up).

Embodiments of present disclosure may include a hazard detector 10 including a first movement sensor and a second movement sensor, and a UVC flame sensor. Hazard detector 10 may include the ability to measure flame intensities, and not alarm if a flame is stable and a human presence is detected. Hazard detector 10 may, if a human leaves the area after a flame has been created, monitor the flame, at intervals remind a user that there is an unattended flame, and monitor the flame for changes in intensity. Changes in intensity determined may initiate a series of actions depending on whether a human is present when the change occurred.

In particular examples, the inventions of the present disclosure may include methods for monitoring and diagnostics for hazard detection and detection systems according to any of the embodiments or combination of embodiments of the present disclosure.

Still further within the scope of the inventions is considered a kit for hazard detection according to any of the embodiments or combination of embodiments of the present disclosure.

Other examples include a system and/or an assembly for hazard detectors according to any of the embodiments or combination of embodiments of the present disclosure.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

Those of ordinary skill in the art having the benefit of this disclosure will recognize that a variety of other examples include a variety of shapes, styles, and sizes for the convenience of its user.

As used in this application, the terms "component", "system", "interface" "mechanism", "module" and the like, are intended to refer to a computer and/or electronic-related entity, either hardware, software, software in execution, firmware, middle ware, microcode, and/or any suitable combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Moreover, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art. In addition, various aspects or features described herein can be implemented as a method, apparatus, or article of manufacture using standard programming and/or engineering techniques. Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A hazard detector system comprising:

a hazard detector having one or more sensors and the ability to detect a hazard, the one or more sensors, including a sensor able to detect the appearance of a flame in a monitored area, the one or more sensors, including a sensor able to detect a human presence in a monitored area, a flame detection event record, a human presence detection event record, a motion pre-flame detection adapted to:

trigger a check of the human presence detection event record when the appearance of the flame is detected in monitored area, cross-reference a portion of the human presence detection event record occurring prior to the detection with the appearance of the flame, determine if a human presence detection event occurred during a pre-set interval prior to the appearance of the flame, gauge whether the detected flame is a friendly flame or a hostile flame, an alarm that is activated when the flame is determined to be a hostile flame.

2. The hazard detector system of claim 1 wherein the one or more sensors are adapted to detect more than a binary response.

3. The hazard detector system of claim 1 wherein the one or more sensors are adapted to detect characteristics of a recognized hazard.

4. The hazard detector system of claim 1 wherein the one or more sensors may be a presence detector, able to measure one or more of a motion, a sound, an imagery, an absence, and/or combinations thereof.

5. The hazard detector system of claim 4 wherein a presence detector is able to measure a presence or an absence of more than one variable.

6. The hazard detector system of claim 5 including measuring and/or monitoring the hazard over time.

7. The hazard detector system of claim 6 wherein measurement includes a measurement of intensity and/or brightness.

8. The hazard detector of claim 1 wherein said hazard detector includes a hazard detection channel.

9. The hazard detector system of claim 8 wherein said hazard detector includes a movement detection channel.

10. The hazard detector system of claim 9 wherein an overlay of results from more than one sensor produces a multivariable result, and the multivariable result produces a hazard detector action.

11. The hazard detector system of claim 1 including an override option, an alert, a communication system, a sound module with a sound mode, and a hazard detector module.

12. The hazard detector system of claim 1 including a switch adapted to switch between modes dependent on sensors signals with an altered behavior dependent on a current operating mode.

13. The hazard detector system of claim 1 wherein the hazard detector and a detection system combine a hazard sensing with a motion detection to derive a set of resultant actions.

14. The hazard detector system of claim 1, the hazard detector adapted to:

check whether a human was present when the flame was created, measure the size of the flame signal, monitor the flame over time, measure changes in the flame, and/or communicate changes to a user.

15. The hazard detector system of claim 1 including a passive monitoring system wherein the sensor is a UVC sensor.

16. The hazard detector system of claim 15 including an active monitoring system.

17. The hazard detector system of claim 16 including a cloud based component and a communication with the cloud based component.

18. The hazard detector system of claim 17 including a multi-state diagnostic system for signaling a hazardous condition while minimizing false alarms and non-hazardous condition alerts.

19. A hazard detector apparatus comprising:

a housing having a face and aperture piece, a PC board assembly within the housing, a battery compartment, a flame detector sensor for flame detection in a detection space, a communication module, and a control system having a hazard detection module including at least one microprocessor configured for:

establishing a baseline for a detected flame, logging an intensity variation of a detected flame over time, determining if the detected flame is in a location where the flame is allowed, producing an overlay of results about the detected flame, producing a multivariable result, analyzing the multivariable result to determine if the flame that was correctly detected in the detection space should produce a hazard detector action, implementing an alarm, implementing control algorithms, processing communications between the sensors, and providing a WiFi communication.

20. The hazard detector apparatus of claim 19, the flame detector sensor sensitive enough to detect a flame at a 30 foot distance or more.

21. A method for hazard detection comprising:

monitoring a detection space with a detection apparatus, detecting the presence of a flame in the detection space, determining if a flame is allowable in the detection space, forming a detection event record over time beginning with a flame detection event as a baseline, cross-referencing the presence of the flame in the detection space to determine if a flame is increasing, decreasing, or remaining the same as to the baseline, using the cross-referencing to determine if the flame is a friendly flame or a hostile flame, and issuing an alarm signal or resisting issuing an alarm signal based upon the cross-referencing.

* * * * *